(12) United States Patent
Nakayama

(10) Patent No.: US 9,508,464 B2
(45) Date of Patent: Nov. 29, 2016

(54) BUS BAR COVER, AND BUS BAR WITH COVER

(75) Inventor: Osamu Nakayama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 133 days.

(21) Appl. No.: 14/236,397

(22) PCT Filed: Aug. 7, 2012

(86) PCT No.: PCT/JP2012/070036
§ 371 (c)(1),
(2), (4) Date: Jan. 31, 2014

(87) PCT Pub. No.: WO2013/021981
PCT Pub. Date: Feb. 14, 2013

(65) Prior Publication Data
US 2014/0158396 A1 Jun. 12, 2014

(30) Foreign Application Priority Data
Aug. 10, 2011 (JP) .................. 2011-174839

(51) Int. Cl.
*H01R 4/70* (2006.01)
*H01B 7/02* (2006.01)
(Continued)

(52) U.S. Cl.
CPC ................ *H01B 7/02* (2013.01); *H01B 17/56* (2013.01); *H01M 2/206* (2013.01); *H01M 2/34* (2013.01); *H01M 2/32* (2013.01)

(58) Field of Classification Search
CPC ............ H02B 1/21; H02B 1/00; H02B 1/20; H02G 7/00; H02G 15/26; H02G 15/20; H02G 15/34; H02G 5/00; H02G 5/10; H02G 15/22; H02G 15/02; H02G 15/06; H02G 3/0431; H02G 3/08; H02G 3/10; H02G 3/081; H02G 3/14; H02G 3/105; H02G 15/076; H02G 3/088; H02G 3/16; H02G 3/0641; H02G 3/065; H02G 3/0658; H02G 3/0666; H02G 3/00; H02G 3/02; H02G 5/002; H02G 15/00; H02G 5/005; H01R 4/66; H01R 9/032; H01F 27/14; H01B 7/29; H01B 17/34; H01B 17/36; H01B 11/06; H01B 17/00; H01B 17/06; H01B 17/18; H01B 17/24; H01B 17/56; H05K 9/0018; H05K 9/0001; H01M 2/206; H01M 2/32; H01M 2/34
USPC .......... 361/611; 429/158; 174/5 R, 378, 481, 174/488, 504, 60, 656, 68.1, 68.2, 71 B, 174/70 B, 149 B
See application file for complete search history.

(56) References Cited

U.S. PATENT DOCUMENTS 3,887,394 A * 6/1975 Kaye ................... H01M 2/1055
220/4.21
(Continued)

FOREIGN PATENT DOCUMENTS

| JP | A-9-106802 | 4/1997 |
| JP | A-2011-8957 | 1/2011 |
| JP | A-2011-49155 | 3/2011 |

OTHER PUBLICATIONS

JP 2011-008957 English Transation Published Jan. 13, 2011.*
(Continued)

Primary Examiner — Angel R Estrada
Assistant Examiner — Pete Lee
(74) Attorney, Agent, or Firm — Oliff PLC

(57) ABSTRACT

An insulating bus bar cover is attachable to a bus bar between cell groups, both ends of the bus bar being respectively fixable to electrode terminals having opposite polarities in order to electrically connect the electrode terminals. The bus bar cover includes a main body portion for covering the bus bar while exposing both ends of the bus bar, hinge portions that are provided at ends of the main body portion, and lid portions that are attached via the hinge portions to the main body portion, and are pivotable by the hinge portions so as to cover or expose the ends.

8 Claims, 19 Drawing Sheets

(51) Int. Cl.
  *H01M 2/20*  (2006.01)
  *H01M 2/34*  (2006.01)
  *H01B 17/56* (2006.01)
  *H01M 2/32*  (2006.01)

(56) References Cited

U.S. PATENT DOCUMENTS

| | | | | |
|---|---|---|---|---|
| 3,956,576 | A | * | 5/1976 | Jensen ................. H01R 11/284 174/138 F |
| 4,562,125 | A | * | 12/1985 | Davis ............................. 429/65 |
| 5,804,770 | A | * | 9/1998 | Tanaka ................. H01M 2/206 174/138 F |
| 2003/0054239 | A1 | * | 3/2003 | Watanabe ........... H01M 2/1072 429/152 |
| 2011/0027634 | A1 | | 2/2011 | Kishimoto et al. |
| 2011/0223466 | A1 | * | 9/2011 | Lee ..................... H01M 2/1077 429/158 |
| 2012/0009461 | A1 | * | 1/2012 | Kim .................... H01M 2/1077 429/158 |

OTHER PUBLICATIONS

JP 09-106802 English Translation Published on Apr. 22, 1997.*
Oct. 23, 2012 International Search Report issued in International Patent Application No. PCT/JP2012/070036.

* cited by examiner

BUS BAR COVER, AND BUS BAR WITH COVER

This application is the national phase of PCT International Application No. PCT/JP2012070036 that has an International filing date of Aug. 7, 2012 and designated the United States of America and claims priority to Japanese Patent App. No. JP 2011-174839 that was filed on Aug. 10, 2011. The disclosure of the prior applications is hereby incorporated by reference herein in their entirety.

BACKGROUND

Battery modules for automobiles such as electric automobiles or hybrid automobiles include a cell group in which a plurality of cells are arranged in a row. Each of the cells forming the cell group has a positive electrode terminal and a negative electrode terminal, and the electrode terminals having opposite polarities respectively included in adjacent cells are electrically connected by a metal bus bar.

The bus bar is attached to each pair of such electrode terminals at a plurality of locations on the cell group. Such a bus bar is used to electrically connect the cells forming the cell group in series.

If the bus bar is attached to each pair of electrode terminals in the cell group, the attachment operation takes an extensive amount of time. Accordingly, a battery wiring module is used that can simultaneously position a plurality of bus bars on the respective pairs of electrode terminals as shown in JP 2011-8957A and so on. This sort of battery wiring module is configured such that a plurality of bus bars are held by an insulating substrate made of a resin or the like, and is placed on and fixed to the cell group.

If the number of cells contained in a cell group is too large, attachment errors and the like of the electrode terminals may accumulate, and pitches between the electrode terminals having opposite polarities may be larger or smaller than the allowable range. If the above-described battery wiring module is used in this state, it may be rather difficult to attach the bus bars to the respective pairs of electrode terminals. Accordingly, in the above-described battery module, all cells may not be treated as one cell group, but they may be used in a state of being divided into a plurality of cell groups. Furthermore, the cells may be divided into a plurality of cell groups also due to limited space in which the battery module is to be installed, for example.

Note that the plurality of cell groups is electrically connected to each other by dedicated bus bars. Both ends of this sort of bus bar are fixed by bolting or the like respectively to electrode terminals having opposite polarities. The bus bar extends to link the cell groups in a state where both ends are fixed.

SUMMARY

Technical Problem

If the bus bar extending to link the cell groups is left exposed, tools or the like may be brought into contact with the bus bar, which may result in a short-circuit of the battery module. Accordingly, it is conceivable to cover the bus bar with an insulating material. However, the ends of the bus bar have to be exposed, at least during the attachment operation of the bus bar, in order to avoid interference with the attachment operation. Preferably, the ends of the bus bar are also covered by an insulating material after the bus bar is attached between the cell groups.

However, there is no known technique for covering the bus bar with an insulating material while satisfying these requests, which is problematic.

Provided herein is a technique for covering, with an insulating material, a bus bar for electrically connecting cell groups, wherein ends of the bus bar can be exposed from the insulating material during attachment of the bus bar between the cell groups, and the ends of the bus bar can be covered by the insulating material after attachment of the bus bar between the cell groups.

Solution to Problem

An insulating bus bar cover is provided that is attachable to a bus bar between a cell group in which a plurality of cells including a pair of positive and negative electrode terminals are arranged in a row and a cell group of the same type adjacent to said cell group, both ends of the bus bar being respectively fixable to electrode terminals having opposite polarities in order to electrically connect the electrode terminals, the bus bar cover including: a main body portion for covering the bus bar while exposing both ends of the bus bar; hinge portions that are provided at ends of the main body portion; and lid portions that are attached via the hinge portions to the main body portion, and are pivotable by the hinge portions so as to cover or expose the ends of the bus bar. Since the bus bar cover has this configuration, the ends of the bus bar can be exposed from or covered by the bus bar cover as necessary.

The bus bar cover preferably further includes engagement portions that are provided at the lid portions; and engageable portions that are provided at the ends of the main body portion, wherein engagement of the engageable portions with the engagement portions fixes the lid portions in a state where the lid portions cover the ends of the bus bar. Since the bus bar cover includes the engagement portions and the engageable portions, the lid portions are fixed in a state where they cover the ends of the bus bar.

The bus bar cover is preferably configured such that the main body portion includes: a tubular member for covering the bus bar while exposing both ends of the bus bar; and frame members that are provided at ends of the tubular member, and surround the ends of the bus bar exposed from the tubular member; and the hinge portions and the engageable portions are provided on the frame members.

The bus bar cover may be configured such that the tubular member includes a bottom portion that covers a lower face of the bus bar and a top portion that covers an upper face of the bus bar, and the bottom portion and the top portion are detachably attached to the bus bar. Since the tubular member is detachably attached to the bus bar, the bus bar cover can be attached later to the bus bar.

The bus bar cover may be configured such that the ends of the bus bar respectively include a fixing portion that can be placed on the electrode terminals and fixed to the electrode terminals, and a rising portion that rises from the fixing portion. Since the ends of the bus bar include the fixing portions and the rising portions, positioning with respect to the electrode terminals that are to be fixed to the fixing portions can be easily performed.

The present invention is directed to a bus bar with a cover, including: a bus bar that is fixable between a cell group in which a plurality of cells including a pair of positive and negative electrode terminals are arranged in a row and a cell group of the same type adjacent to said cell group, both ends of the bus bar being respectively fixable to electrode terminals having opposite polarities in order to electrically connect the electrode terminals; and an insulating bus bar cover that is attachable to the bus bar, and includes: a main body portion for covering the bus bar while exposing both ends of the bus bar, hinge portions that are provided at ends of the main body portion, and lid portions that are attached via the hinge portions to the main body portion, and are pivotable by the hinge portions so as to cover or expose the ends of the bus bar.

Advantageous Effects

Provided herein is a technique for covering, with an insulating material, a bus bar for electrically connecting cell groups, wherein ends of the bus bar can be exposed from the insulating material during attachment of the bus bar between the cell groups, and the ends of the bus bar can be covered by the insulating material after attachment of the bus bar between the cell groups.

DETAILED DESCRIPTION OF THE EMBODIMENTS

Figure 1:
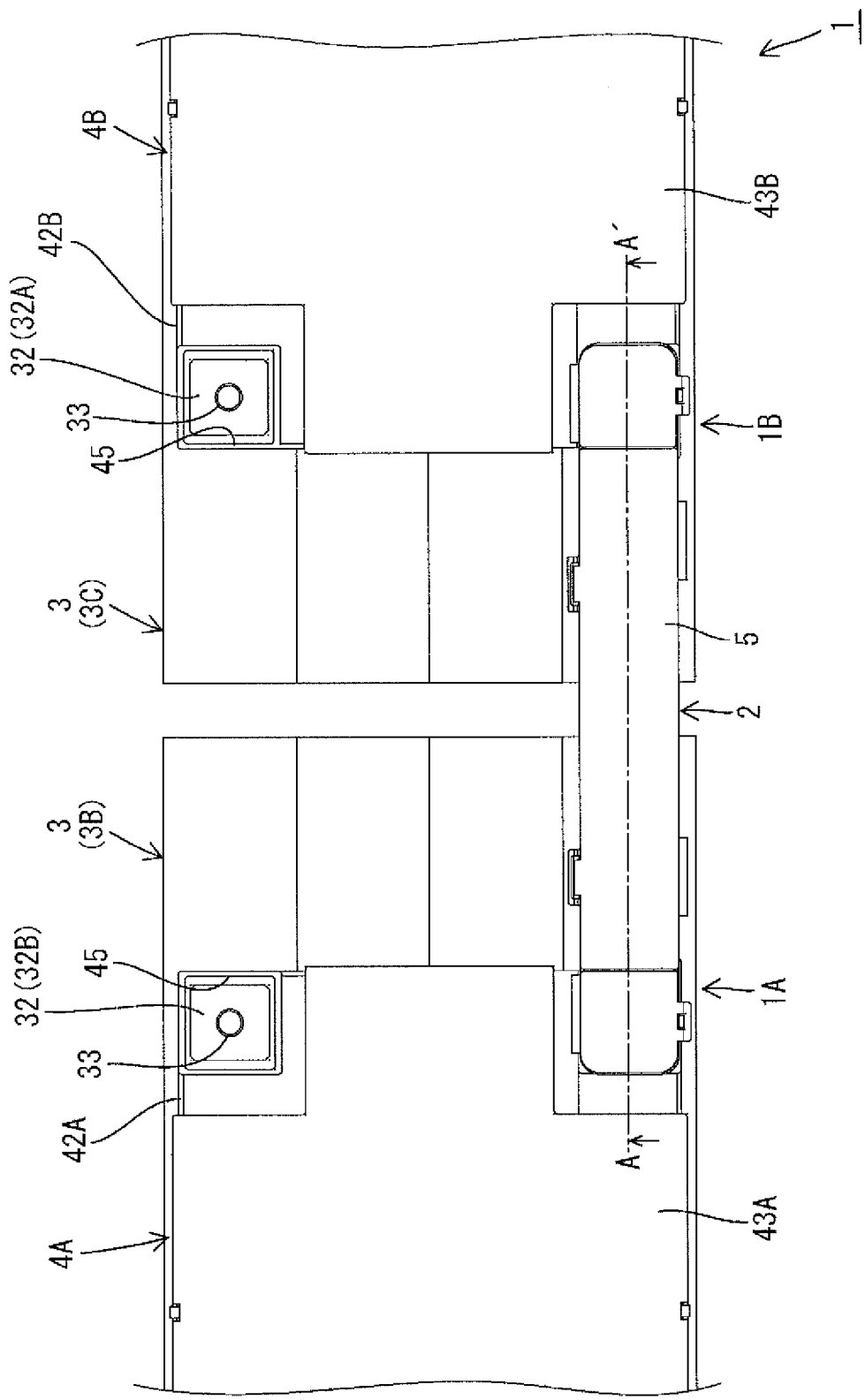
FIG. 1 is a plan view of a battery module including a bus bar with cover according to Embodiment 1.

Embodiment 1
Battery Module
Hereinafter, Embodiment 1 will be described with reference to FIGS. 1 to 18. FIG. 1 is a plan view of a battery module 1 including a bus bar 2 with cover according to Embodiment 1. The battery module 1 shown in FIG. 1 is used as a drive source for automobiles such as electric automobiles and hybrid automobiles. As shown in FIG. 1, the battery module 1 is configured by a first battery module 1A and a second battery module 1B that are connected to each other via the bus bar 2 with cover. In FIG. 1, the first battery module 1A is shown on the left side, and the second battery module 1B is shown on the right side. The lower side in FIG. 1 corresponds to the front side (the front face side) of the battery module 1, and the upper side in FIG. 1 corresponds to the rear side (the rear face side) of the battery module 1. Furthermore, the left-right direction in FIG. 1 corresponds to the left-right direction of the battery module 1.

First Battery Module
First, one of the battery modules, denoted by 1A, will be described with reference to FIGS. 1 to 8. The first battery module 1A includes two cell groups 3, a first battery wiring module 4A fixed to the cell groups 3, and a cover 43A for the first battery wiring module 4A, which is placed on the first battery wiring module 4A.

Figure 2:
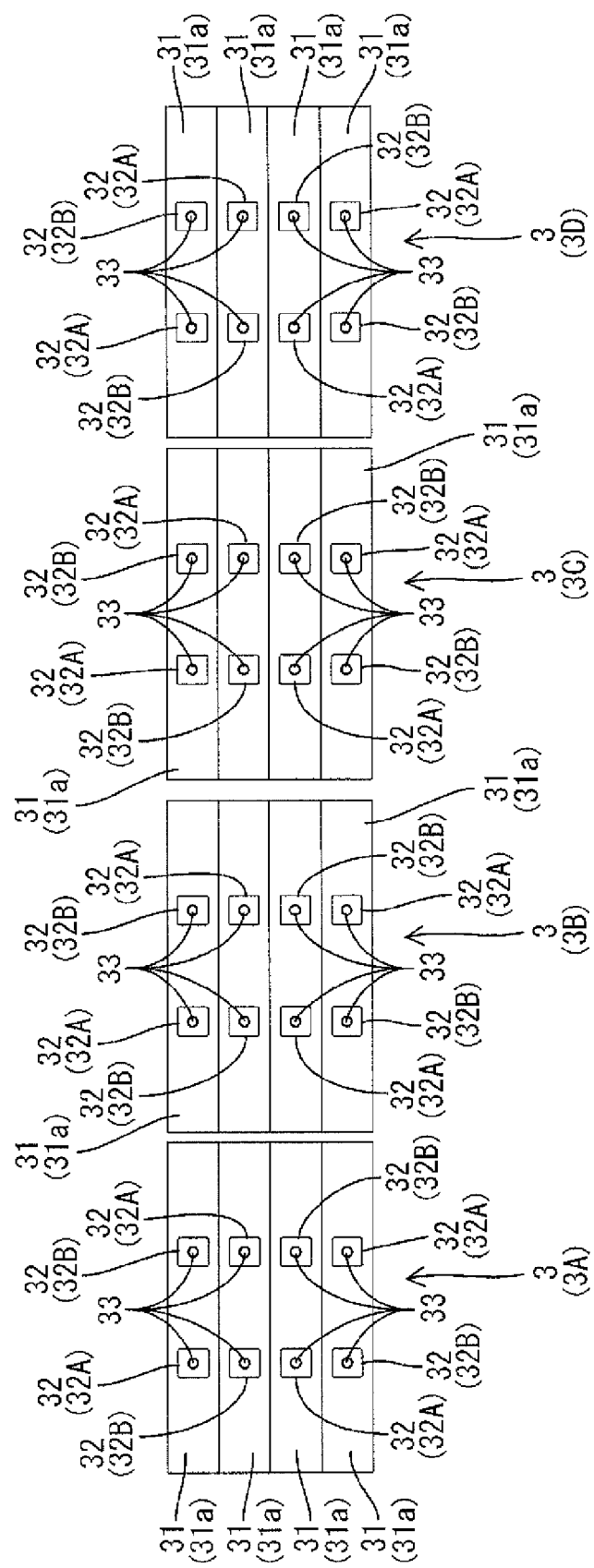
FIG. 2 is a plan view of cell groups.

Cell Group
FIG. 2 is a plan view of the cell groups 3. FIG. 2 shows four cell groups 3A, 3B, 3C, and 3D that are arranged side by side. Of these, the cell groups 3A and 3B are used for the first battery module 1A, and the cell groups 3C and 3D are used for the second battery module 1B (described later).

As shown in FIG. 2, each of the cell groups 3 (3A, 3B, 3C, and 3D) is configured by four cells 31 that are stacked in a row. The cell groups 3 (3A, 3B, 3C, and 3D) are arranged side by side with a gap interposed therebetween along the left-right direction shown in FIG. 2. In this embodiment, the gap between the cell group 3B used for the first battery module 1A and the cell group 3C used for the second battery module 1B is set to be larger than the gap between the other cell groups 3.

Each cell 31 forming the cell groups 3 internally includes an electricity generating element (not shown). The cell 31 includes a main body portion 31a in the shape of a flat rectangular solid internally including the electricity generating element, and two electrode terminals 32 (32A and 32B) that are provided on an upper face of the main body portion 31a. One of the electrode terminals, denoted by 32A, is a positive electrode, and the other electrode terminal, denoted by 32B, is a negative electrode.

The electrode terminals 32A and 32B of the cell groups 3 (3A, 3B, 3C, and 3D) vertically project upward from the upper faces of the cells 31 (the main body portions 31a). Each of the electrode terminals 32 (32A and 32B) is configured by a nut in the shape of a square tube, and a round screw hole 33 is formed through the center of the nut.

The cells 31 forming the cell groups 3 are arranged such that their electrode terminals 32 (32A and 32B) face in the same direction (upward). The cells 31 in the cell groups 3 are arranged such that the adjacent electrode terminals 32 of the adjacent cells 31 have opposite polarities. That is to say, the positive and negative electrode terminals 32 are alternately arranged in the direction in which the cells 31 are stacked in a row (the front-rear direction of the cell groups 3).

Also, the cell groups 3A and 3B used for the first battery module 1A are arranged such that the adjacent electrode terminals 32 of the adjacent cells 31 respectively in the different cell groups 3A and 3B have opposite polarities.

Furthermore, the cell group 3B used for the first battery module 1A and the cell group 3C used for the second battery module 1B are arranged such that the adjacent electrode terminals 32 of the adjacent cells 31 respectively in the different cell groups 3B and 3C have opposite polarities.

The electrode terminals 32 (32A and 32B) of the cell groups 3A and 3B used for the first battery module 1A are arranged on the same plane. The cell groups 3 (3A, 3B, 3C, and 3D) are placed on and fixed to a holding plate (not shown) that is disposed on the lower faces of the cells 31.

First Battery Wiring Module

Figure 3:
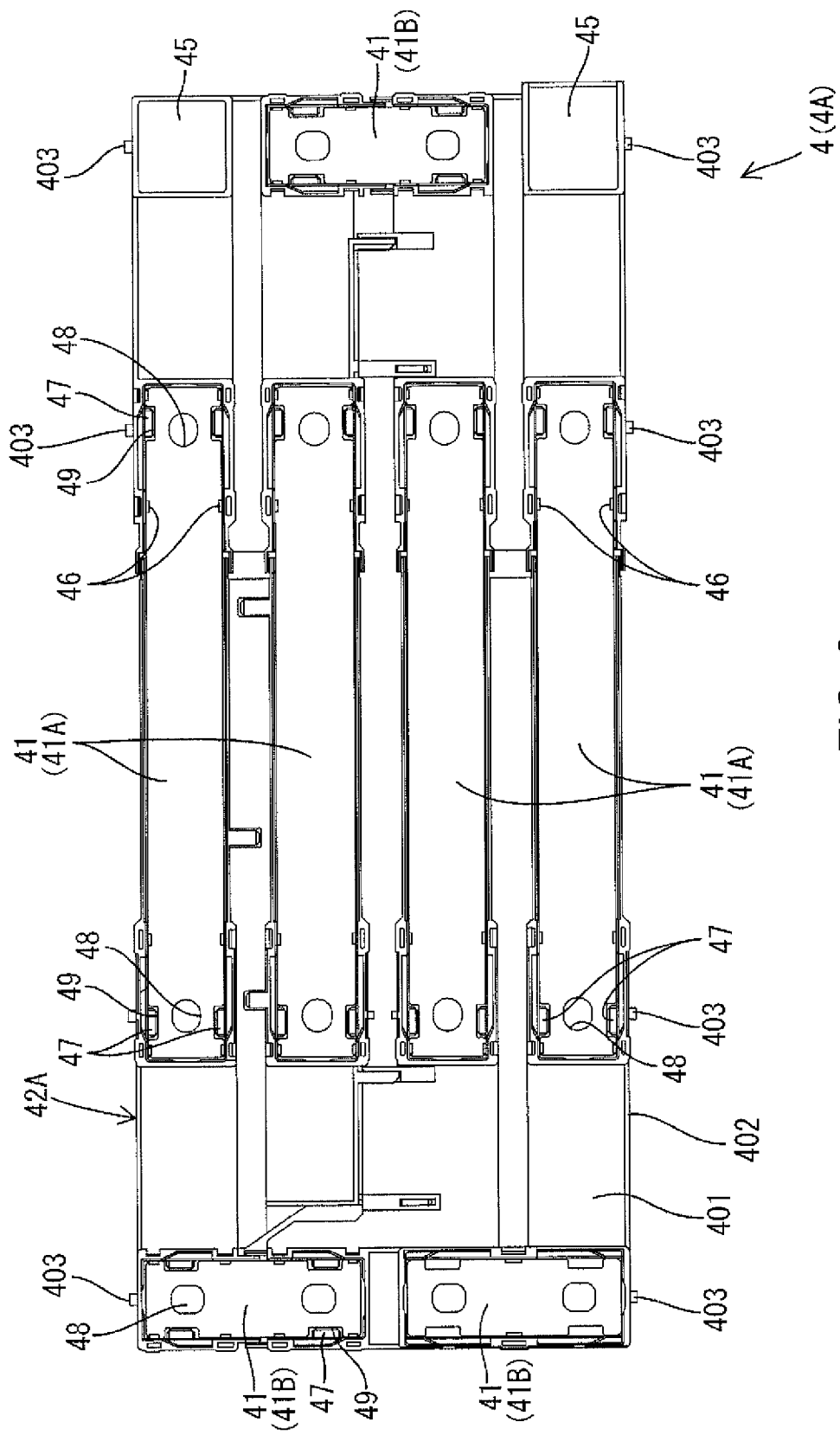
FIG. 3 is a plan view of a first battery wiring module.

FIG. 3 is a plan view of the first battery wiring module 4A. The first battery wiring module 4A is placed on the upper faces of the cell groups 3A and 3B and attached to the cell groups 3A and 3B. The two cell groups 3A and 3B are connected by the first battery wiring module 4A. This first battery wiring module 4A mainly includes a plurality of connection members 41, and a resin protector 42A in the shape of a container that accommodates the connection members 41.

Connection Member

Figure 4:
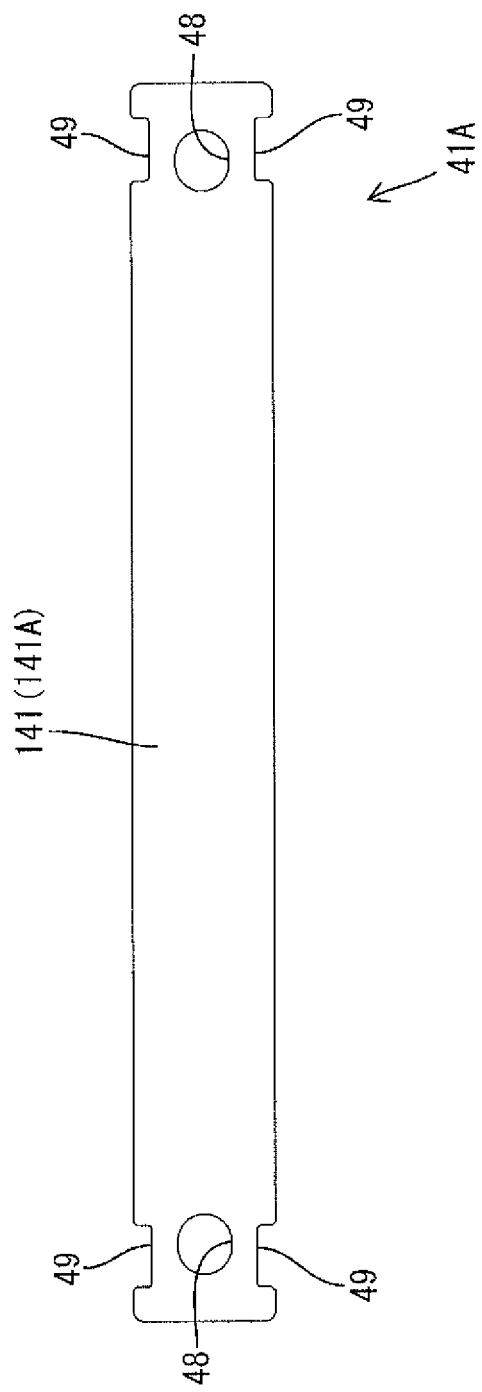
FIG. 4 is a plan view of a first connection member.

The connection members 41 are formed by processing a metal material such as copper, copper alloy, stainless steel (SUS), or aluminum, into a predetermined shape. The connection members 41 each have a substantially elongated (belt-like) shape, and are configured as members generally known as bus bars. In this embodiment, two types of connection members having different lengths are used as the connection members 41. Of these, the longer ones are referred to as first connection members 41A, and the shorter ones are referred to as second connection members 41B. FIG. 4 is a plan view of the first connection member 41A. As shown in FIG. 4, the first connection member 41A includes an elongated main body portion 141 (141A), through holes 48 through which shank portions of fixing bolts are inserted respectively at both ends in the longitudinal direction of the main body portion 141 (141A), and cut-out portions 49 that sandwich the through hole 48 at each end of the main body portion 141 (141A).

Figure 5:
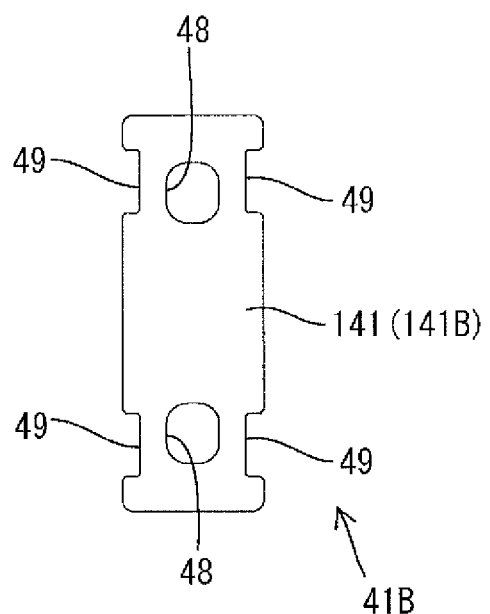
FIG. 5 is a plan view of a second connection member.

FIG. 5 is a plan view of the second connection member 41B. As shown in FIG. 5, the second connection member 41B has the same basic configuration as that of the first connection member 41A although the length is shorter than that of the first connection member 41A. Specifically, the second connection member 41B includes an elongated main body portion 141 (141B), through holes 48 through which shank portions of fixing bolts are inserted respectively at both ends in the longitudinal direction of the main body portion 141 (141B), and cut-out portions 49 that sandwich the through hole 48 at each end of the main body portion 141 (141B).

The connection members 41 extend to link the electrode terminals 32A and 32B having opposite polarities so as to electrically connect these electrode terminals, at a plurality of locations on the cell groups 3. The cells 31 forming the cell groups 3 (3A and 3B) are connected in series by the connection members 41. The first connection member 41A is used to electrically connect the electrode terminals 32A and 32B having opposite polarities of the adjacent cells 31 respectively in the cell groups 3A and 3B. Meanwhile, the second connection member 41B is used to electrically connect the electrode terminals 32A and 32B having opposite polarities of the cells 31 that are adjacent to each other in the direction in which they are stacked in a row (the front-rear direction), in each of the cell groups 3A and 3B. Note that the connection members 41 are used in a state where they are held by the resin protector 42A (see FIG. 3).

The ends of the connection members 41 are placed on the electrode terminals 32 and are fixed to the electrode terminals 32. At that time, the position of the through hole 48 at each end of each connection member 41 is set to the position of the screw hole 33 of the corresponding electrode terminal 32. Then, a shank portion of a fixing bolt (not shown) is inserted into the through hole 48 of the connection member 41 and the screw hole 33 of the electrode terminal 32, and the fixing bolt is screwed into the screw hole 33 such that the connection member 41 and the electrode terminal 32 are in close contact with each other.

Note that the through hole 48 provided in the connection member 41 is in the shape of a so-called elongated hole when viewed from above, and is set to be larger than the screw hole 33 of the electrode terminal 32. Furthermore, the through hole 48 is elongated in the longitudinal direction of the connection member 41. Since the connection member 41 includes such an elongated through hole 48, the through hole 48 of the connection member 41 can be positioned on the screw hole 33 of the electrode terminal 32 such that the fixing bolt can be inserted into these holes even if the position of the electrode terminal 32 is dislocated from the position where it should be. Note that such a dislocation of the electrode terminals 32 is caused by, for example, attachment errors of the electrode terminals 32 on the cells 31, deformation such as swelling of the cells 31, or errors in the arrangement pitches in the cell groups 3A and 3B.

The plurality of connection members 41 form a predetermined pattern in the container-like resin protector 42A (see FIG. 3). The first connection members 41A are arranged along the left-right direction in FIG. 3. Meanwhile, the second connection members 41B are arranged along the vertical direction in FIG. 3. That is to say, the first connection members 41A and the second connection members 41B are arranged along directions that are perpendicular to each other.

Resin Protector

Figure 6:
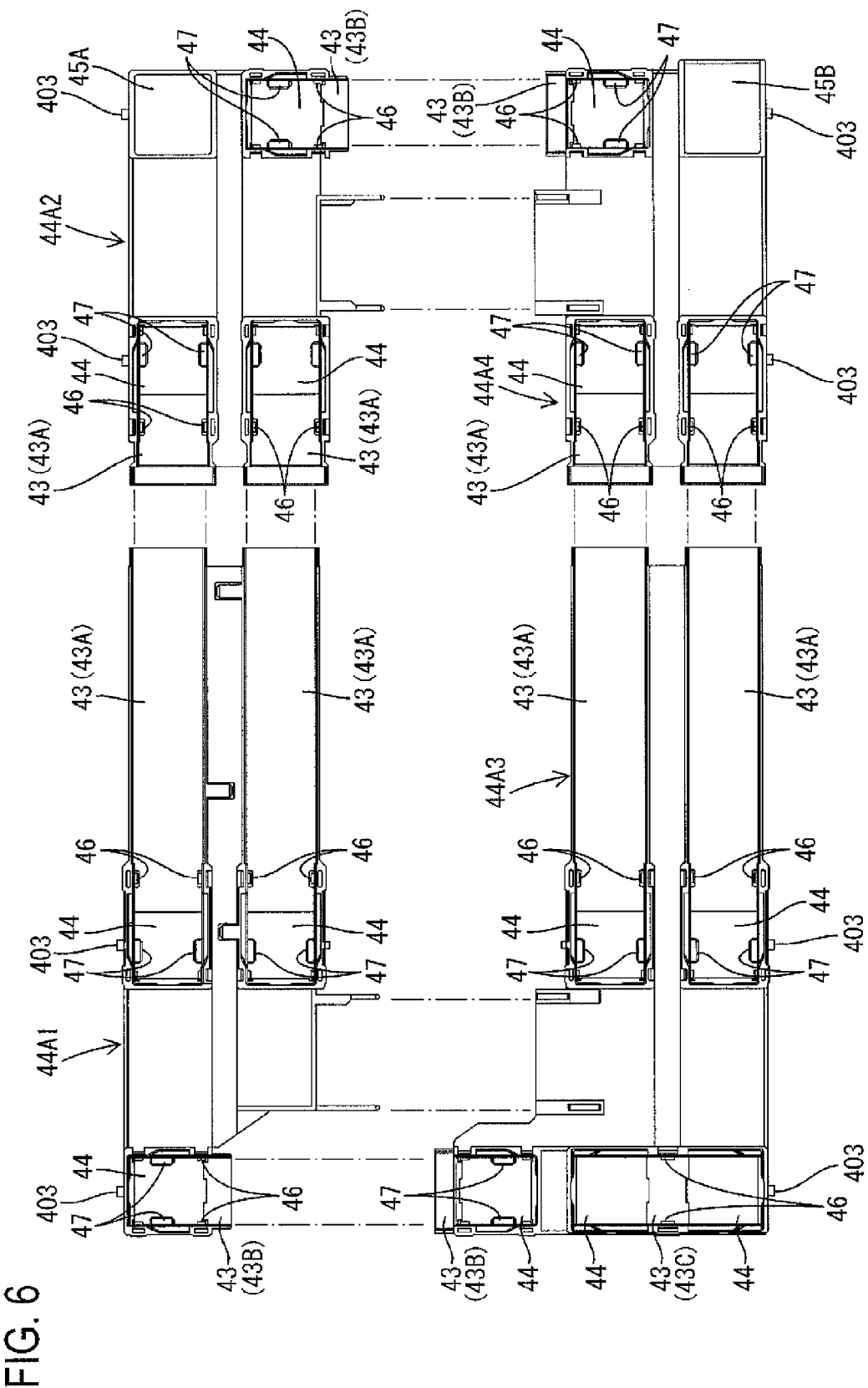
FIG. 6 is a plan view of coupling units forming a resin protector.

The resin protector 42A is formed by processing an insulating composite resin material into a predetermined shape. FIG. 6 is a plan view of coupling units 42A1, 42A2, 42A3, and 42A4 forming the resin protector 42A. The resin protector 42A of this embodiment is formed by combining the four coupling units 42A1, 42A2, 42A3, and 42A4 shown in FIG. 6.

The coupling unit 42A1 is combined with the coupling unit 42A2. The coupling units 42A1 and 42A2 form two connection member accommodating portions 43 (43A) that accommodate the first connection members 41A. The connection member accommodating portions 43 (43A) are each in the shape of a small container that extends along the left-right direction in FIG. 6, inside of which the first connection member 41A is held. Furthermore, the connection member accommodating portions 43 (43A) can be extended and retracted along the longitudinal direction of the first connection members 41A.

The connection member accommodating portion 43 (43A) includes an elongated bottom plate portion on which the first connection member 41A is placed, and a peripheral wall portion in the shape of a square tube that surrounds the bottom plate portion. Each of the bottom plate portion and the peripheral wall portion is divided between the coupling unit 42A1 side and the coupling unit 42A2 side. Both ends in the longitudinal direction of the bottom plate portion are respectively provided with opening portions 44. At the opening portions 44, the ends of the first connection member 41A are exposed from the connection member accommodating portion 43 (43A) so as to allow contact with the electrode terminals 32.

The inner face of the peripheral wall portion is provided with a plurality of restricting protrusions 46 that restrict upward movement of the first connection member 41A in the thickness direction (in the upper direction). The restricting protrusions 46 are shaped so as to project from the inner face of the peripheral wall portion, and press the first connection member 41A from its upper face side to the bottom plate portion side. The inner face of the peripheral wall portion is further provided with a plurality of engagement protrusions 47 that respectively engage with the cut-out portions 49 of the first connection member 41A. As shown in FIG. 3, the engagement protrusions 47 are shaped so as to project from the inner face of the peripheral wall portion, and extend along the longitudinal direction of the first connection member 41A. Furthermore, the engagement protrusions 47 are each set to be smaller than the cut-out portion 49, and a gap is provided in advance between both ends in the longitudinal direction of the engagement protrusion 47 and the cut-out portion 49.

The coupling unit 42A1 side of the connection member accommodating portion 43 (43A) can move in the left-right direction in FIG. 3 along the longitudinal direction of the first connection member 41A, within a range in which the engagement protrusions 47 can move inside the cut-out portions 49. In a similar manner, the coupling unit 42A2 side of the connection member accommodating portion 43 (43A) also can move in the left-right direction along the longitudinal direction of the first connection member 41A, within a range in which the engagement protrusions 47 can move inside the cut-out portions 49. In this manner, the connection member accommodating portions 43 (43A) can be extended and retracted (i.e., can slide) along the longitudinal direction of the first connection members 41A.

Furthermore, the coupling unit 42A3 is combined with the coupling unit 42A4. The coupling units 42A3 and 42A4 form two connection member accommodating portions 43 (43A) that accommodate the first connection members 41A. The connection member accommodating portions 43 (43A) configured by the coupling units 42A3 and 42A4 have a basic configuration similar to that of the above-described connection member accommodating portions 43 (43A) configured by the two coupling units 42A1 and 42A2. The connection member accommodating portions 43 (43A) configured by the coupling units 42A3 and 42A4 also can be extended and retracted (i.e., can slide) along the longitudinal direction of the first connection members 41A.

Furthermore, the above-described coupling unit 42A1 is combined also with the coupling unit 42A3. The coupling units 42A1 and 42A3 form one connection member accommodating portion 43 (43B) that accommodates the second connection member 41B. The connection member accommodating portions 43 (43B) is in the shape of a small container that extends along the vertical direction in FIG. 6, inside of which the second connection member 41B is held. Furthermore, the connection member accommodating portion 43 (43B) can be extended and retracted along the longitudinal direction of the second connection member 41B.

The connection member accommodating portion 43 (43B) includes an elongated bottom plate portion on which the second connection member 41B is placed, and a peripheral wall portion in the shape of a square tube that surrounds the bottom plate portion. Each of the bottom plate portion and the peripheral wall portion is divided between the coupling unit 42A1 side and the coupling unit 42A3 side. Both ends in the longitudinal direction of the bottom plate portion are respectively provided with opening portions 44. At the opening portions 44, the ends of the second connection member 41B are exposed from the connection member accommodating portion 43 (43B) so as to allow contact with the electrode terminals 32.

The inner face of the peripheral wall portion is provided with a plurality of restricting protrusions 46 that restrict upward movement of the second connection member 41B in the thickness direction (in the upper direction). The restricting protrusions 46 are shaped so as to project from the inner face of the peripheral wall portion, and press the second connection member 41B from its upper face side to the bottom plate portion side. The inner face of the peripheral wall portion is further provided with a plurality of engagement protrusions 47 that respectively engage with the cut-out portions 49 of the second connection member 41B. As shown in FIG. 3, the engagement protrusions 47 are shaped so as to project from the inner face of the peripheral wall portion, and extend along the longitudinal direction of the second connection member 41B. Furthermore, the engagement protrusions 47 are each set to be smaller than the cut-out portion 49, and a gap is provided in advance between both ends in the longitudinal direction of the engagement protrusion 47 and the cut-out portion 49.

The coupling unit 42A1 side of the connection member accommodating portion 43 (43B) can move in the vertical direction in FIG. 3 along the longitudinal direction of the second connection member 41B, within a range in which the engagement protrusions 47 can move inside the cut-out portions 49. In a similar manner, the coupling unit 42A3 side of the connection member accommodating portion 43 (43B) also can move in the vertical direction in FIG. 3 along the longitudinal direction of the second connection member 41B, within a range in which the engagement protrusions 47 can move inside the cut-out portions 49. In this manner, the connection member accommodating portion 43 (43B) can be extended and retracted (i.e., can slide) along the longitudinal direction of the second connection member 41B.

Furthermore, the coupling unit 42A2 is combined also with the coupling unit 42A4. The coupling units 42A2 and 42A4 form one connection member accommodating portion 43 (43B) that accommodates the second connection member 41B. The connection member accommodating portion 43 (43B) configured by the coupling units 42A2 and 42A4 has a basic configuration similar to that of the above-described connection member accommodating portion 43 (43B) configured by the coupling units 42A1 and 42A3. The connection member accommodating portion 43 (43B) configured by the coupling units 42A2 and 42A4 also can be extended and retracted (i.e., can slide) along the longitudinal direction of the second connection member 41B.

Note that the coupling unit 42A3 is provided with a connection member accommodating portion 43 (43C) that accommodates the second connection member 41B. The connection member accommodating portion 43 (43C) is not extended or retracted along the longitudinal direction of the second connection member 41B, but includes a bottom plate portion and a peripheral wall portion that surrounds the bottom plate portion as in the case of the connection member accommodating portion 43 (43B). Furthermore, the connection member accommodating portion 43 (43C) includes the opening portions 44, the engagement protrusions 47, and the like, as in the case of the connection member accommodating portion 43 (43B).

Furthermore, the coupling unit 42A2 and the coupling unit 42A4 are respectively provided with opening portions 45A and 45B. The electrode terminals 32 that are positioned at the ends of the cells 31 connected in series when the first battery wiring module 4A is placed on the cell groups 3A and 3B are respectively exposed from the opening portions 45A and 45B. The electrode terminal 32 (32B) of the cell 31 that is at the rearmost of the cell group 3B is exposed from the opening portion 45A of the coupling unit 42A2. Meanwhile, the electrode terminal 32 (32A) of the cell 31 that is at the frontmost of the cell group 3B is exposed from the opening portion 45B of the coupling unit 42A4. In this embodiment, the opening portion 45B is set to be larger than the opening portion 45A.

This resin protector 42A can be deformed so as to be extended or retracted (extending and retracting deformation) to some extent in each of the left-right direction (the longitudinal direction of the first connection members 41A) and the front-rear direction (the longitudinal direction of the second connection members 41B) in accordance with e.g., a dislocation of the ends of the connection members 41 and the electrode terminals 32, which may be caused by attachment errors of the electrode terminals 32 or the like. Note that the resin protector 42A can be regarded on the whole as including one bottom plate 401 and a peripheral wall 402 in the shape of a flat square tube that surrounds the bottom plate 401.

The resin protector 42A accommodates, in addition to the connection members 41, a plurality of voltage detection terminals (not shown) for detecting the voltage of the cells 31. The voltage detection terminals are placed on the respective connection members 41, and voltage detection electrical wires (not shown) are respectively connected to the voltage detection terminals by pressure bonding or the like. Note that these voltage detection electrical wires are connected to a battery ECU (not shown). The battery ECU has a microcomputer, devices, and the like mounted therein, and has a well-known configuration including the functions for detecting voltages, currents, temperatures, and the like of the cells 31, or for controlling charge and discharge of the cells 31, for example.

The peripheral wall 402 of the resin protector 42A is provided with a plurality of protrusion-like engagement portions 403. The engagement portions 403 are provided on the peripheral wall 402 along the long sides of the resin protector 42A. The engagement portions 403 are used when attaching the cover 43A to the resin protector 42A.

Figure 7:
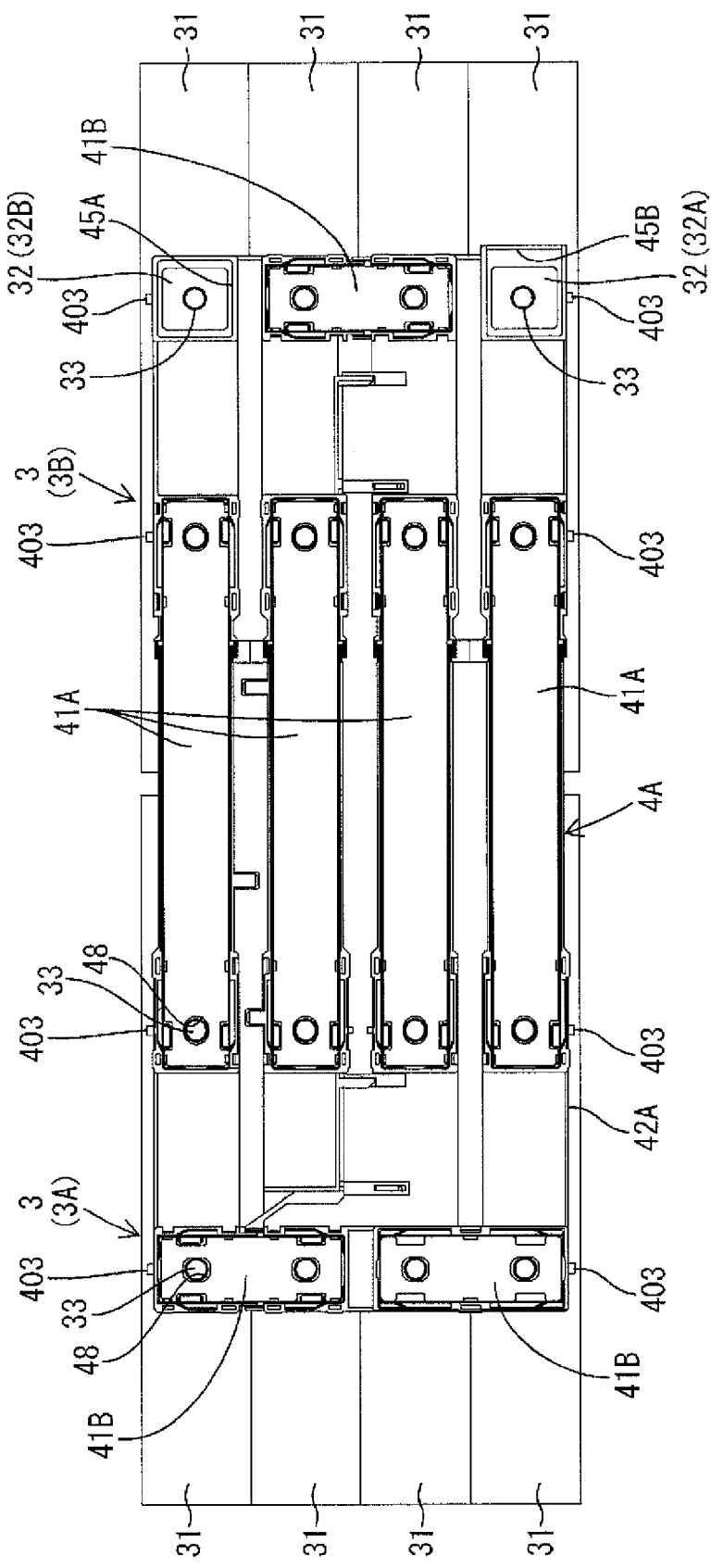
FIG. 7 is a plan view of the first battery wiring module placed on the cell groups.

FIG. 7 is a plan view of the first battery wiring module 4A that has been placed on the cell groups 3A and 3B. As shown in FIG. 7, the first battery wiring module 4A is placed on and fixed to the upper faces of the two cell groups 3A and 3B. The two cell groups 3A and 3B are electrically connected to each other by the first battery wiring module 4A. The cells 31 contained in the two cell groups 3A and 3B are connected in series by the first battery wiring module 4A.

Module Cover

Figure 8:
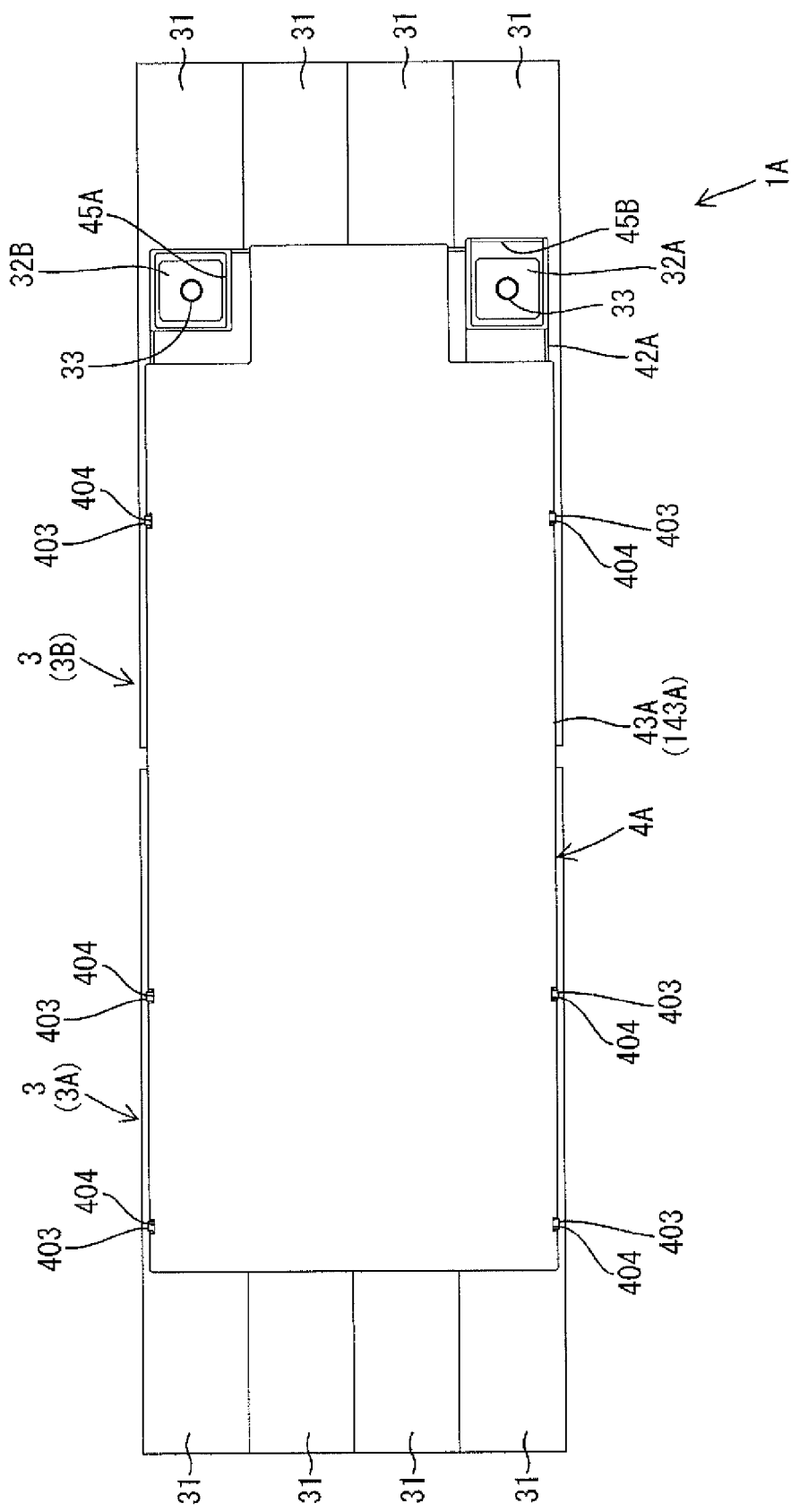
FIG. 8 is a plan view of a first battery module.

FIG. 8 is a plan view of the first battery module 1A. The first battery module 1A shown in FIG. 8 includes the cover 43A for the first battery wiring module 4A. The cover 43A is attached to the first battery wiring module 4A (the resin protector 42A) so as to cover the connection members 41 and the like in the resin protector 42A. The cover 43A is substantially in the shape of a rectangle elongated in the left-right direction when viewed from above. In order to prevent tools or the like from being brought into contact with the connection members 41 and causing a short-circuit of the battery module 1 (the first battery module 1A), for example, the cover 43A is detachably attached to the resin protector 42A so as to cover the opening of the container-like resin protector 42A (portion surrounded by the upper end of the peripheral wall 402). The cover 43A as well as the resin protector 42A is made of an insulating composite resin material. The cover 43A includes a cover main body portion 143A in the shape of a plate, and a plurality of engageable portions 404 that are provided on the edges along the long sides of the cover main body portion 143A. Each of the engageable portions 404 is frame-shaped, and the protrusion-like engagement portions 403 provided on the resin protector 42A are inserted into the engageable portions 404. The engagement portions 403 and the engageable portions 404 engage with each other, and, thus, the cover 43A is attached to the resin protector 42A.

As shown in FIG. 8, the right end of the cover 43A has a longer portion only at the center, so that part of the first battery wiring module 4A is exposed without being covered by the cover 43A. At these exposed portions, the two opening portions 45A and 45B of the resin protector 42A are respectively arranged, and the electrode terminals 32 (32B and 32A) are respectively exposed from the opening portions 45A and 45B.

Second Battery Module

Figure 9:
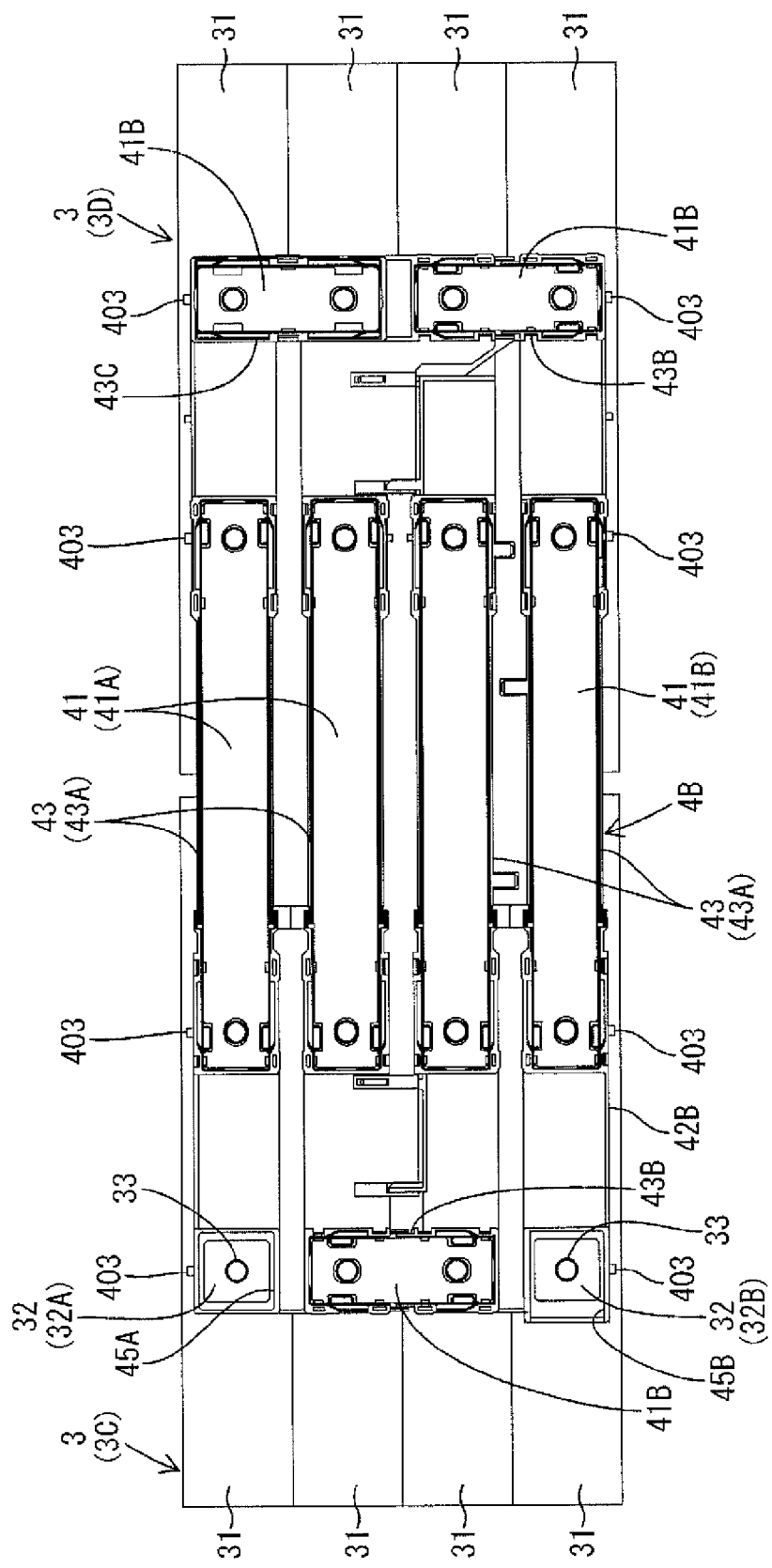
FIG. 9 is a plan view of a second battery wiring module placed on cell groups.

Next, the second battery module 1B will be described with reference to FIGS. 1 and 9. FIG. 9 is a plan view of a second battery wiring module 4B that has been placed on the cell groups 3C and 3D. As shown in FIG. 1, the second battery module 1B is used together with the first battery module 1A. The second battery module 1B is similar to the above-described first battery module 1A, and the second battery module 1B has a basic configuration similar to that of the first battery module 1A. A battery module obtained by rotating by 180° the first battery module 1A shown in FIG. 1 is substantially the same as the second battery module 1B shown in FIG. 1. The second battery module 1B includes two cell groups 3C and 3D, a second battery wiring module 4B fixed to the cell groups 3C and 3D, and a cover 43B for the second battery wiring module 4B, which is placed on the second battery wiring module 4B. The cover 43B has the same basic configuration as that of the cover 43A.

The second battery wiring module 4B has substantially the same basic configuration as that of the first battery wiring module 4A. Note that the structure of a resin protector 42B included in the second battery wiring module 4B is partially different from that of the resin protector 42A. Specifically, the positions of the two opening portions 45A and 45B in the resin protector 42B are reversed from those in the resin protector 42A.

As shown in FIG. 9, the second battery wiring module 4B is placed on and fixed to the upper faces of the two cell groups 3C and 3D. The two cell groups 3C and 3D are electrically connected to each other by the second battery wiring module 4B. That is to say, the cells 31 contained in the two cell groups 3C and 3D are connected in series by the second battery wiring module 4B.

The electrode terminal 32 (32A) of the cell 31 that is at the rearmost of the cell group 3C is exposed from the opening portion 45A of the resin protector 42B. Meanwhile, the electrode terminal 32 (32B) of the cell 31 that is at the frontmost of the cell group 3C is exposed from the opening portion 45B of the resin protector 42B.

Figure 10:
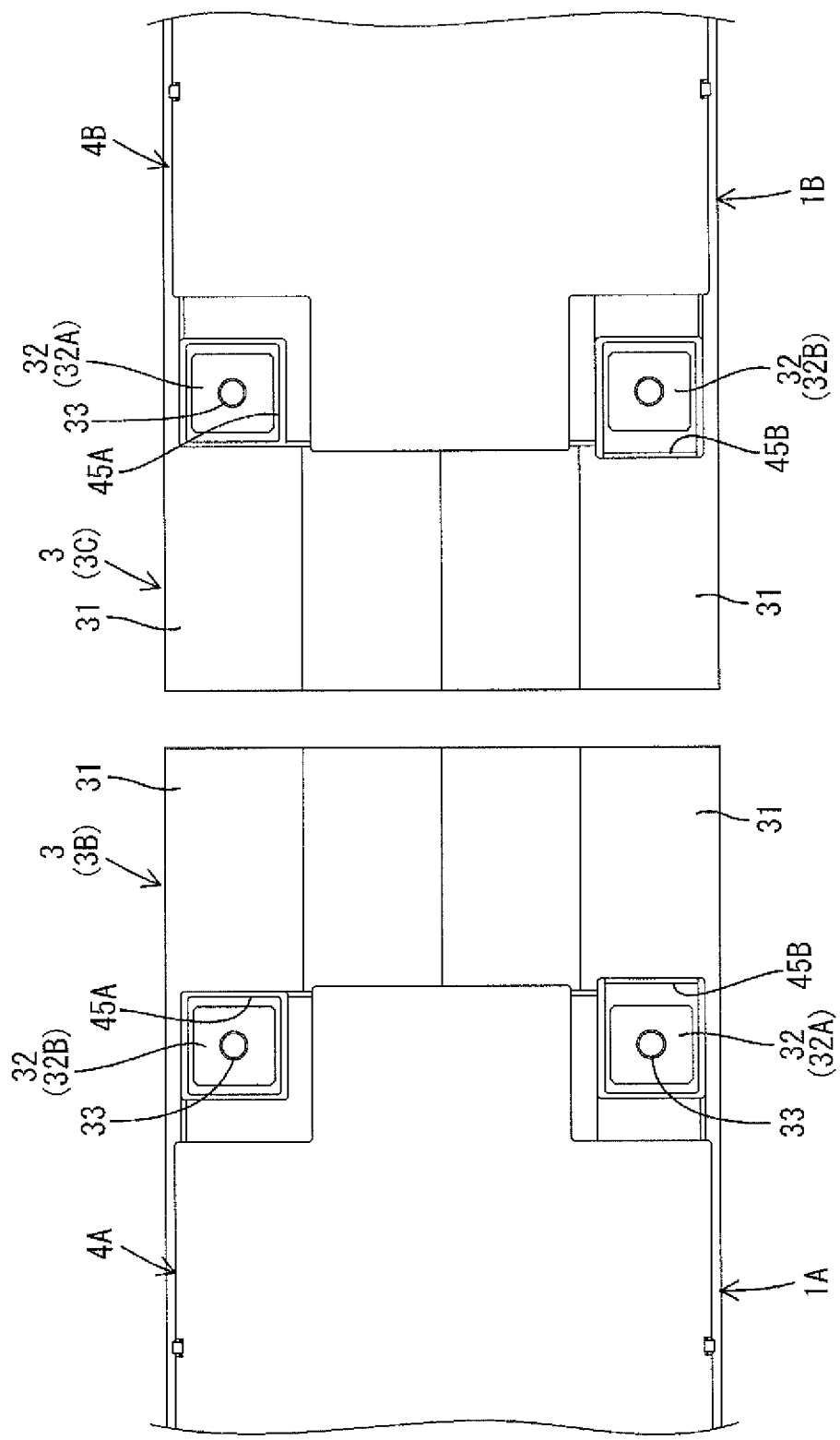
FIG. 10 is a plan view of a first battery module and a second battery module that are adjacent to each other with a gap interposed therebetween.

FIG. 10 is a plan view of the first battery module 1A and the second battery module 1B that are adjacent to each other with a gap interposed therebetween. As shown in FIG. 10, the first battery module 1A and the second battery module 1B are arranged side by side with a predetermined gap interposed therebetween such that the cell group 3B side of the first battery module 1A and the cell group 3C side of the second battery module 1B face each other. The two exposed electrode terminals 32 (32B and 32A) in the first battery module 1A and the two exposed electrode terminals 32 (32A and 32B) in the second battery module 1B are positioned close to each other.

As shown in FIG. 10, the electrode terminal 32B exposed from the opening portion 45A of the first battery module 1A is adjacent to the electrode terminal 32A exposed from the opening portion 45A of the second battery module 1B. The adjacent electrode terminals 32B and 32A having opposite polarities respectively in the cell groups 3B and 3C are respectively connected to external connection terminals (not shown). Furthermore, these external connection terminals are connected to electrical wire terminals that are further linked to external inverters or the like.

Furthermore, as shown in FIG. 10, the electrode terminal 32A exposed from the opening portion 45B of the first battery module 1A is adjacent to the electrode terminal 32B exposed from the opening portion 45B of the second battery module 1B. The adjacent electrode terminals 32A and 32B having opposite polarities respectively in the cell groups 3B and 3C are respectively connected to the ends of the bus bar 2 with cover as shown in FIG. 1.

Bus Bar With Cover

Next, the structure of the bus bar 2 with cover will be described with reference to FIGS. 11 to 16. The bus bar 2 with cover is formed by attaching a bus bar cover 5 to a bus bar 21. The cell groups 3A and 3B of the first battery module 1A and the cell groups 3C and 3D of the second battery module 1B are electrically connected to each other (connected in series) by the bus bar 21 included in the bus bar 2 with cover.

Bus Bar

Figure 11:
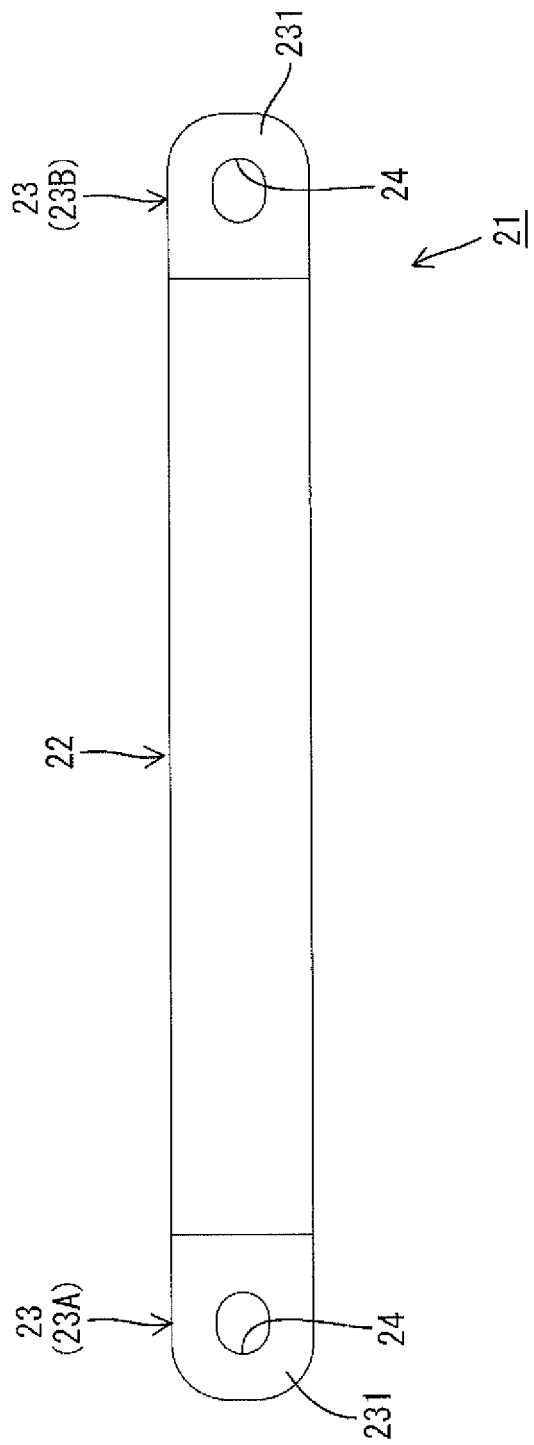
FIG. 11 is a plan view of a bus bar.
Figure 12:
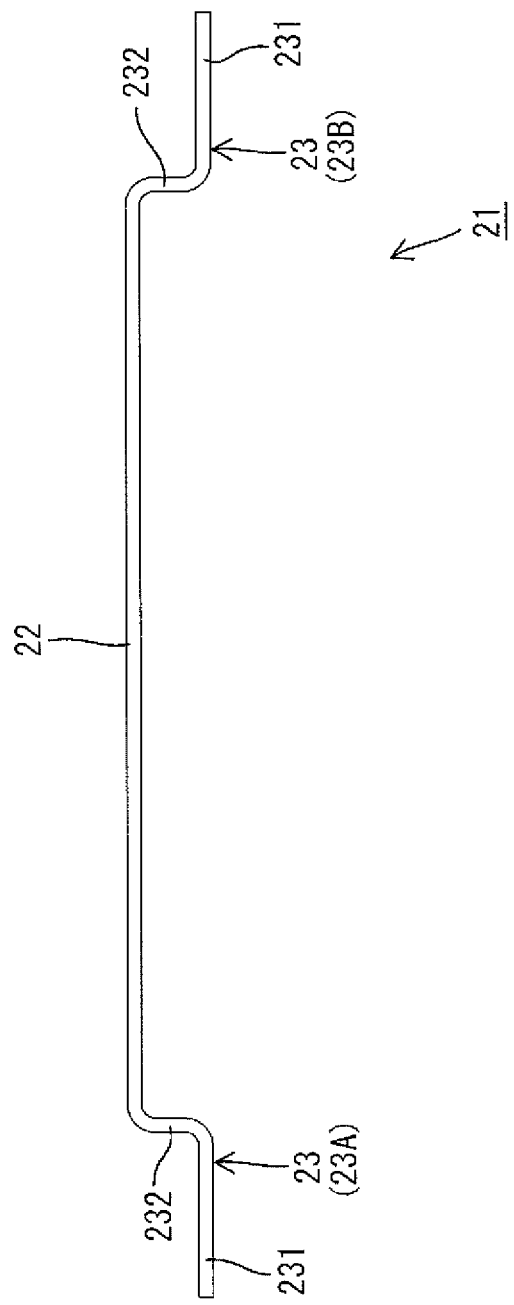
FIG. 12 is a side view of the bus bar.

FIG. 11 is a plan view of the bus bar 21, and FIG. 12 is a side view of the bus bar 21. As shown in FIG. 11, the bus bar 21 has a substantially elongated (belt-like) overall shape. The bus bar 21 is formed by processing (e.g., punching, or bending) a plate material made of metal such as copper, copper alloy, stainless steel (SUS), or aluminum, into a predetermined shape. The bus bar 21 extends to link the first battery module 1A and the second battery module 1B, and is used to electrically connect these battery modules. Note that the bus bar 21 of this embodiment is larger (longer) than the above-described connection member 41 used for the first battery wiring module 4A and the like.

The bus bar 21 includes a bus bar main body portion 22 and a pair of ends 23 (23A and 23B) that sandwich the bus bar main body portion 22. The ends 23 (23A and 23B) are respectively provided with through holes 24.

The bus bar main body portion 22 is configured by an elongated plate-like portion that extends in a straight line. Both ends of the bus bar main body portion 22 respectively continue to the ends 23 (23A and 23B) each of which is configured by an L-shaped plate material when viewed from the side. Each end 23 is configured by a flat fixing portion 231 and a rising portion 232 that continues from the fixing portion 231.

The fixing portion 231 is placed on the electrode terminal 32 and is fixed to the electrode terminal 32. The fixing portion 231 is substantially rectangular, but has rounded corners as shown in FIG. 11. Furthermore, the fixing portion 231 is provided with the above-described through hole 24. As shown in FIG. 11, the through hole 24 is in the shape of a so-called elongated hole when viewed from above, and is elongated in the longitudinal direction of the bus bar main body portion 22. The through hole 24 is set to be larger than the screw hole 33 of the electrode terminal 32 included in the battery modules 1A and 1B. This through hole 24 is formed by performing a known punching process on a plate material made of metal such as those described above. The fixing portion 231 is disposed parallel to the bus bar main body portion 22.

The rising portion 232 rises upward from the fixing portion 231. The upper end of the rising portion 232 is connected to the bus bar main body portion 22. The rising portion 232 is disposed perpendicular to the bus bar main body portion 22 and the fixing portion 231.

Various conditions of the bus bar 21 such as the length of the bus bar main body portion 22, the height of the rising portion 232 (the height from the fixing portion 231), and the size of the fixing portion 231 are set as appropriate, for example, in accordance with the shapes of the first battery module 1A and the second battery module 1B to which the bus bar is to be attached. In this embodiment, the end 23A shown in the left in FIGS. 11 and 12 and the end 23B shown in the right are set to have the same shape.

Bus Bar Cover

Figure 13:
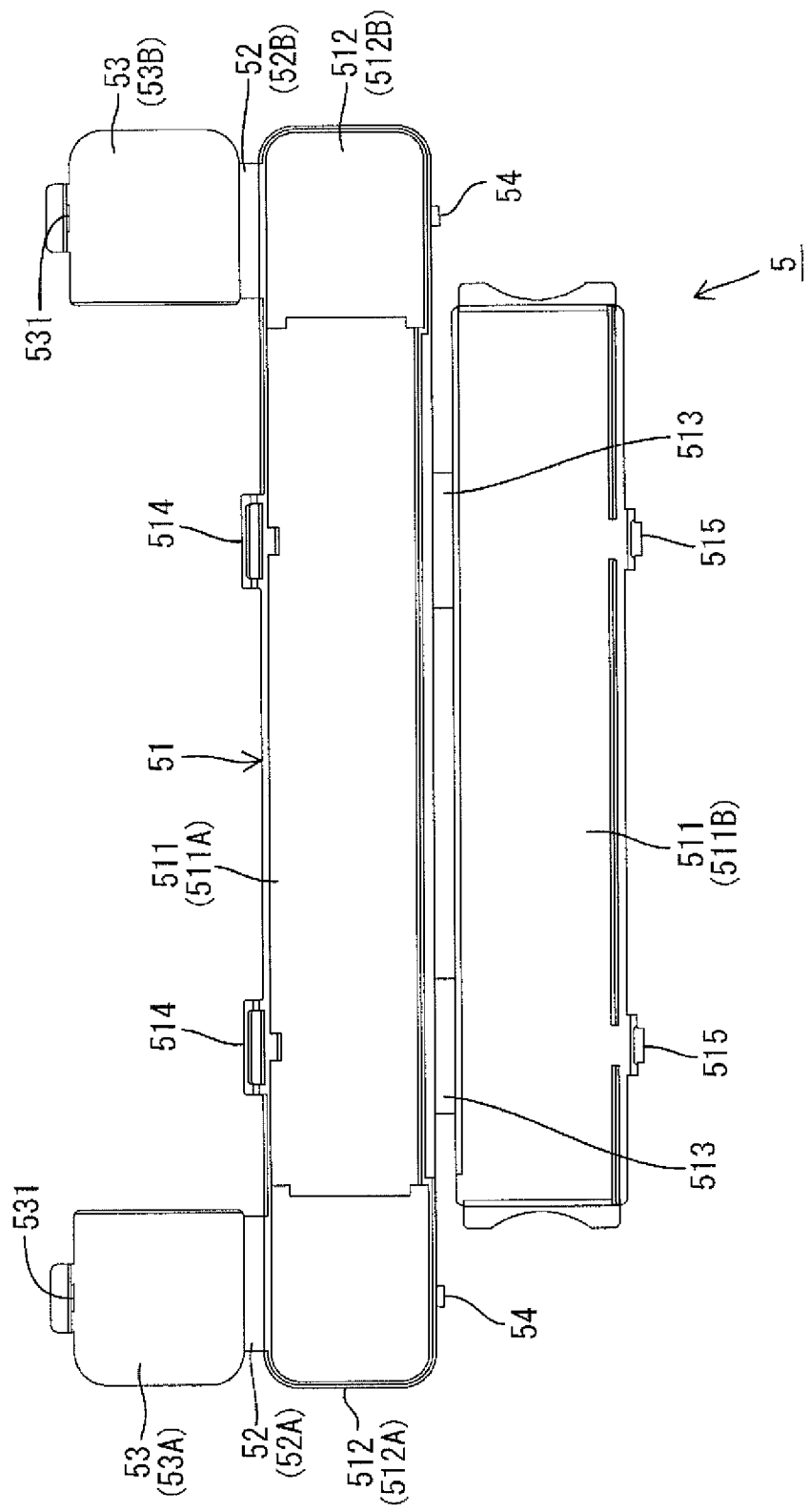
FIG. 13 is a plan view of a bus bar cover in an unfolded state.

The bus bar cover 5 is formed by processing an insulating composite resin material into a predetermined shape. FIG. 13 is a plan view of the bus bar cover 5 in an unfolded state. The bus bar cover 5 of this embodiment is detachably attached to the bus bar 21. The bus bar cover 5 that has been attached to the bus bar 21 is in the overall shape of a tube. On the other hand, the bus bar cover S before the attachment can be unfolded and opened flat as shown in FIG. 13.

Figure 14:
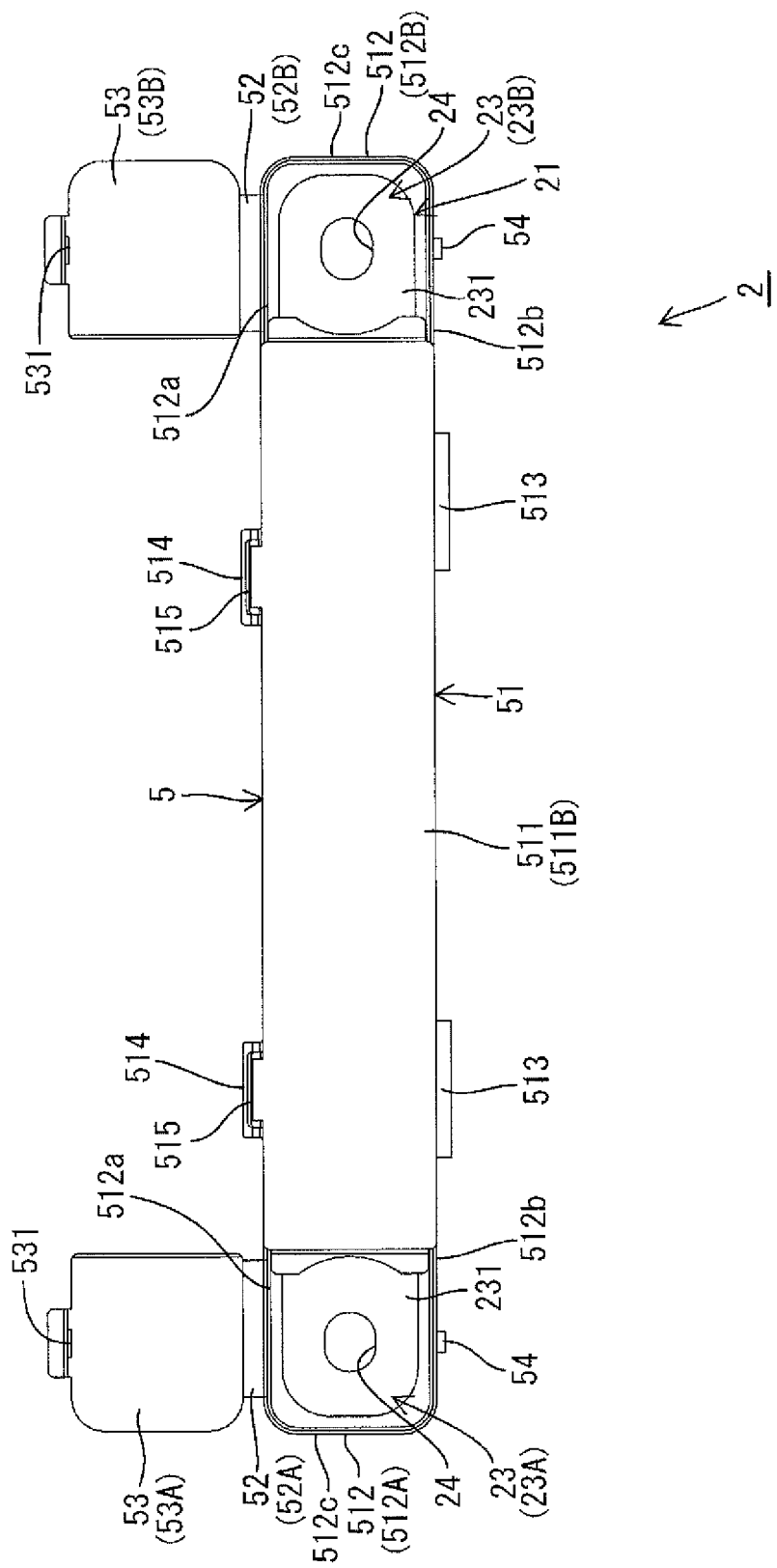
FIG. 14 is a plan view of the bus bar with cover in a state where lid portions are open.
Figure 15:
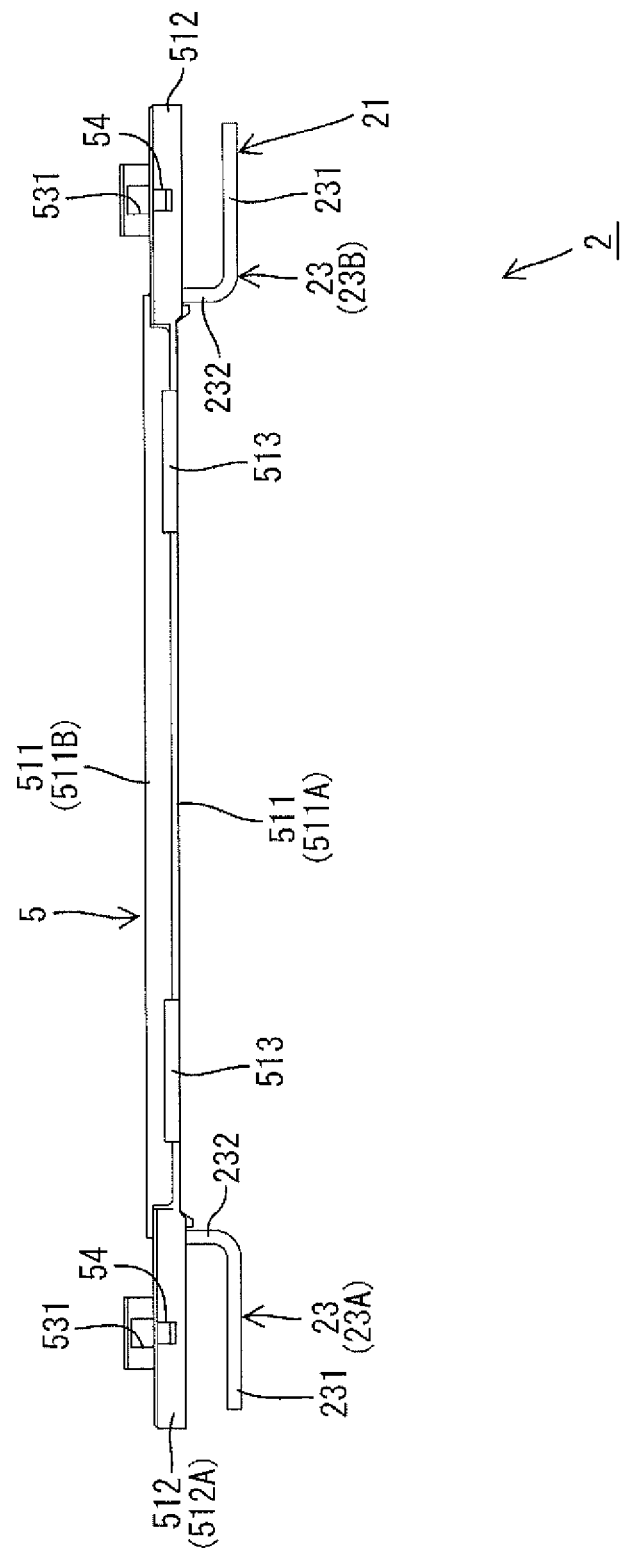
FIG. 15 is a front view of the bus bar with cover in a state where the lid portions are open.
Figure 16:
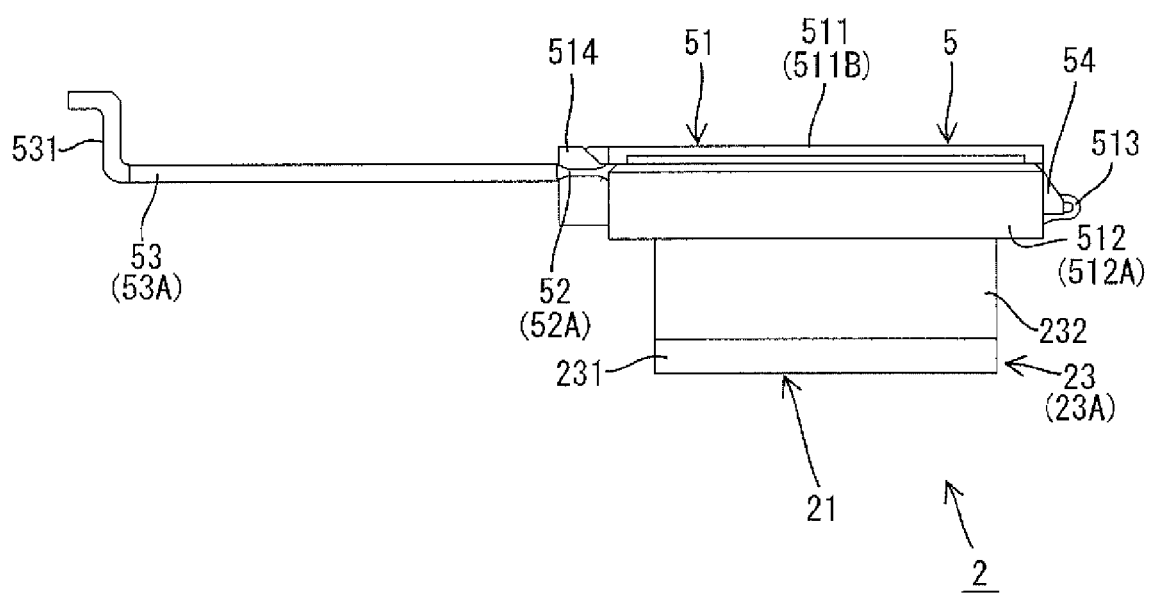
FIG. 16 is a side view of the bus bar with cover in a state where the lid portions are open.

As shown in FIG. 13, the bus bar cover 5 includes a main body portion 51, hinge portions 52 that are provided at the ends of the main body portion 51, and lid portions 53 that are attached via the hinge portions 52 to the main body portion 51. FIG. 14 is a plan view of the bus bar 2 with cover in a state where the lid portions 53 are open, FIG. 15 is a front view of the bus bar 2 with cover in a state where the lid portions 53 are open, and FIG. 16 is a side view of the bus bar 2 with cover in a state where the lid portions 53 are open.

As shown in FIG. 14 and so on, the main body portion 51 is a portion that covers the elongated bus bar main body portion 22 of the bus bar 21, and that is in the overall shape of a tube when being attached to the bus bar 21. The main body portion 51 includes an elongated tubular member 511, and two frame members 512 (512A and 512B) that are provided at respective ends of the tubular member 511.

As shown in FIG. 13, the tubular member 511 has a bottom portion 511A and a top portion 511B. The bottom portion 511A is a portion that mainly covers the lower face of the bus bar main body portion 22, and is in the shape of an elongated plate. Both edges in the longitudinal direction of the bottom portion 511A rise upward by a short distance. Of these, one of the edges is provided with two hinge portions 513. The bottom portion 511 A is connected via the hinge portions 513 to the top portion 511B. Furthermore, the other edge is provided with two frame-shaped (ring-shaped) engagement portions 514.

The top portion 511B is a portion that mainly covers the upper face of the bus bar main body portion 22, and is in the shape of an elongated plate as in the case of the bottom portion 511A. Both edges in the longitudinal direction of the top portion 511B rise upward by a short distance in a state where the bus bar cover 5 is unfolded as shown in FIG. 13. Of these, one of the edges is provided with the above-described two hinge portions 513. Furthermore, the other edge is provided with two protrusion-like engageable portions 515 that are respectively engaged with the frame-shaped engagement portions 514.

The hinge portions 513 are flexible, and, thus, they can be deformed in a bending manner. Accordingly, the top portion 511B and the bottom portion 511A that are connected to each other via the hinge portions 513 can move closer to or away from each other.

When the top portion 511B is overlapped on the bottom portion 511A, the tubular member 511 is in the shape of a flat tube that enwraps the bus bar main body portion 22. Note that, when the engageable portions 515 provided on the top portion 511B are inserted into and engaged with the engagement portions 514 provided in the bottom portion 511A, the top portion 511B and the bottom portion 511A are fixed to each other. Furthermore, as shown in FIG. 14, the ends 23 (23A and 23B) of the bus bar main body portion 22 are respectively exposed from both ends of the tubular member 511.

The frame members 512 (512A and 512B) project outward respectively from both ends of the tubular member 511. In this embodiment, the frame members 512 (512A and 512B) continue respectively from both ends of the bottom portion 511A. One of the frame members, denoted by 512A, has a shape that surrounds the end 23A of the bus bar 21 when viewed from above, when the bus bar cover 5 is attached to the bus bar 21 as shown in FIG. 14. Moreover, as shown in FIG. 15, the frame member 512A is disposed above the fixing portion 231 at the end 23A. The frame member 512A is substantially in the shape of a U when viewed from above. The frame member 512A is configured by two portions 512a and 512b that are arranged parallel to each other along the longitudinal direction of the tubular member 511, and a portion 512c that is disposed between the portions 512a and 512b. One of the two portions 512a and 512b, denoted by 512a, is provided with a hinge portion 52A. A lid portion 53A is attached via the hinge portion 52A to the frame member 512A. Furthermore, the other portion, denoted by 512b, is provided with a protrusion-like engageable portion 54.

Furthermore, the other frame member, denoted by 512B, has the same shape as the above-described frame member 512A, and has a shape that surrounds the end 23B of the bus bar 21 when viewed from above, when the bus bar cover 5 is attached to the bus bar 21 as shown in FIG. 14. Moreover, as shown in FIG. 15, the frame member 512B disposed above the fixing portion 231 at the end 23B. The frame member 512B is substantially in the shape of a U when viewed from above. As in the case of the frame member 512A, the frame member 512B is configured by two portions 512a and 512b that are arranged parallel to each other along the longitudinal direction of the tubular member 511, and a portion 512c that is disposed between the portions 512a and 512b. One of the two portions 512a and 512b, denoted by 512a, is provided with a hinge portion 52B. A lid portion 53B is attached via the hinge portion 52B to the frame member 512B. Furthermore, the other portion, denoted by 512b, is provided with a protrusion-like engageable portion 54.

Note that, as shown in FIG. 14 and so on, the ends 23 (23A and 23B) of the bus bar 21 are exposed from the main body portion 51 of the bus bar cover 5 when not being covered by the lid portions 53 (53A and 53B).

The lid portions 53 (53A and 53B) are in the shape of plates that cover the opening portions inside the frame members 512 (512A and 512B). As described above, the lid portion 53A is connected via the hinge portion 52A to the frame member 512A. The end of the lid portion 53A is provided with a frame-shaped (ring-shaped) engagement portion 531 that engages with the protrusion-like engageable portion 54 provided on the frame member 512A. Meanwhile, the lid portion 53B is connected via the hinge portion 52B to the frame member 512B. The end of the lid portion 53B is provided with a frame-shaped (ring-shaped) engagement portion 531 that engages with the protrusion-like engageable portion 54 provided on the frame member 512B.

The hinge portions 52 (52A and 52B) are flexible, and, thus, they can be deformed in a bending manner. Accordingly, the lid portions 53 (53A and 53B) that are connected via the hinge portions 52 (52A and 52B) to the frame members 512 (512A and 512B) can move closer to the frame members 512 (512A and 512B) so as to cover the ends 23 (23A and 23B) of the bus bar 21. Furthermore, the lid portions 53 (53A and 53B) can move away from the frame members 512 (512A and 512B) so as to expose the ends 23 (23A and 23B) of the bus bar 21. That is to say, the lid portions 53 (53A and 53B) can move (pivot) closer to the frame members 512 (512A and 512B) and away from the frame members 512 (512A and 512B).

Note that, when the lid portions 53 cover the opening portions inside the frame members 512, the protrusion-like engageable portions 54 provided on the frame members 512 are inserted into the frame-shaped engagement portions 531 provided in the lid portions 53, and the engagement portions 531 and the engageable portions 54 engage with each other. Furthermore, when the engagement portions 531 and the engageable portions 54 engage with each other, the lid portions 53 are fixed to the frame members 512. Note that the lid portions 53 are detachably fixed to the frame members 512 by means of the engagement portions 531 and the engageable portions 54.

As shown in FIGS. 14 to 16, the bus bar cover 5 can be attached to the bus bar 21 in a state where the lid portions 53 (53A and 53B) are open. That is to say, the bus bar cover 5 can cover the portion other than the ends 23 (i.e., the bus bar main body portion 22) in a state where the ends 23 (23A and 23B) of the bus bar 21 are left exposed. The bus bar 21 including such a bus bar cover 5 (i.e., the bus bar 2 with cover) can be easily attached to the adjacent electrode terminals 32A and 32B having opposite polarities respectively in the cell groups 3B and 3C (see FIG. 10). Hereinafter, the reason thereof will be described.

Attachment Process

Figure 17:
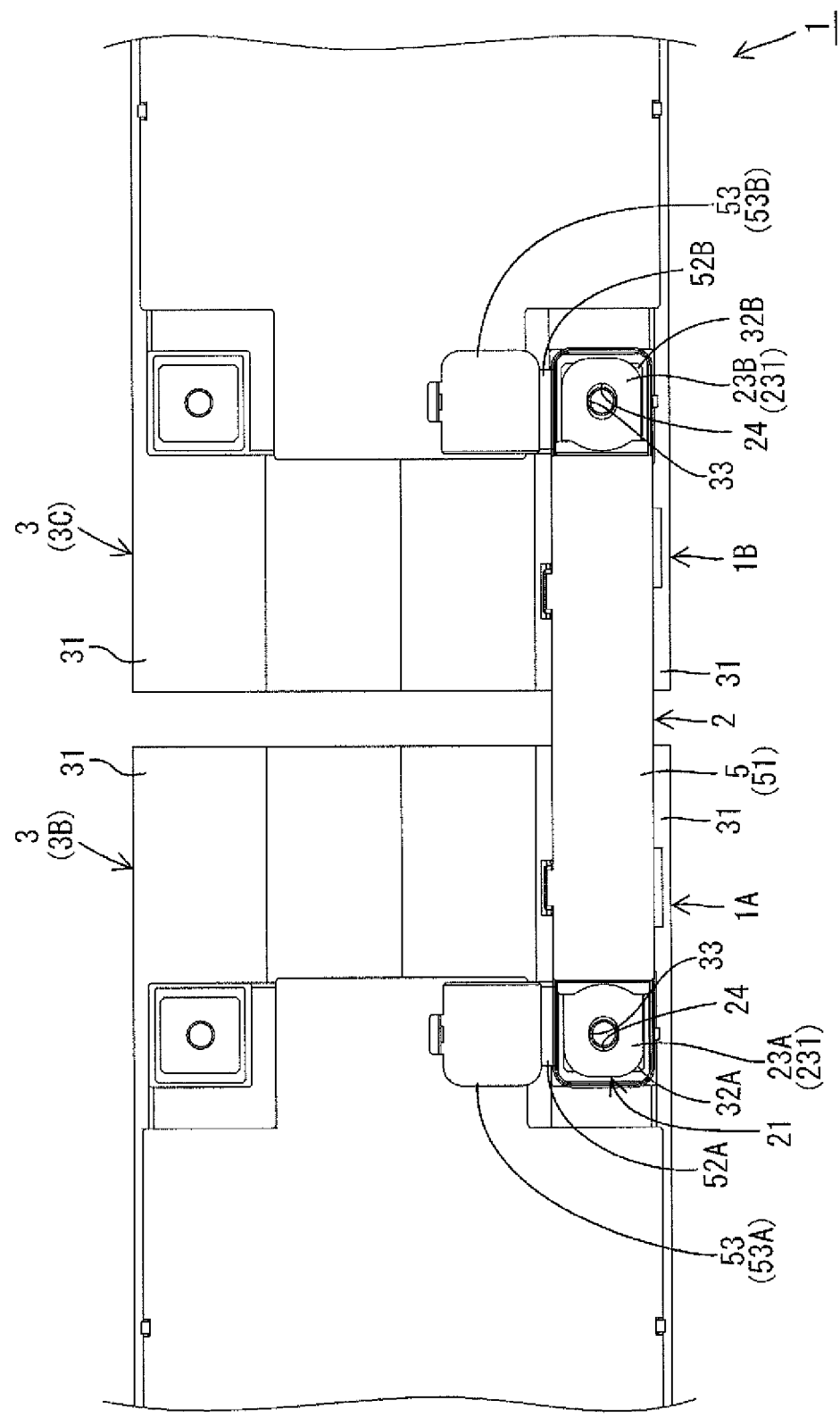
FIG. 17 is a plan view of the bus bar with cover that has been attached to the first battery module and the second battery module in a state where the lid portions are open.

FIG. 17 is a plan view of the bus bar 2 with cover that has been attached to the first battery module 1A and the second battery module 1B in a state where the lid portions 53A and 53B are open. As shown in FIG. 17, the ends of the bus bar 2 with cover are respectively placed on the adjacent electrode terminals 32A and 32B having opposite polarities respectively in the cell groups 3B and 3C. At that time, the lid portions 53A and 53B of the bus bar cover 5 attached to the bus bar 21 are both open, and the ends 23A and 23B of the bus bar 21 are exposed from the bus bar cover 5.

When the lid portions 53A and 53B of the bus bar 2 with cover are open in this manner, the positions of the ends 23A and 23B of the bus bar 21 can be easily checked. Accordingly, the ends 23A and 23B of the bus bar 21 can be easily placed on the electrode terminals 32A and 32B while checking the positions of the ends.

After the ends of the bus bar 2 with cover are placed on the electrode terminals 32A and 32B, the through holes 24 provided at the ends (the ends 23A and 23B) are positioned on the screw holes 33 provided in the electrode terminals 32A and 32B. Also at the time of performing this positioning, if the lid portions 53A and 53B of the bus bar 2 with cover are open, the positions of the through holes 24 and the positions of the screw holes 33 can be easily checked. Accordingly, the through holes 24 can be easily positioned on the screw holes 33.

Figure 18:
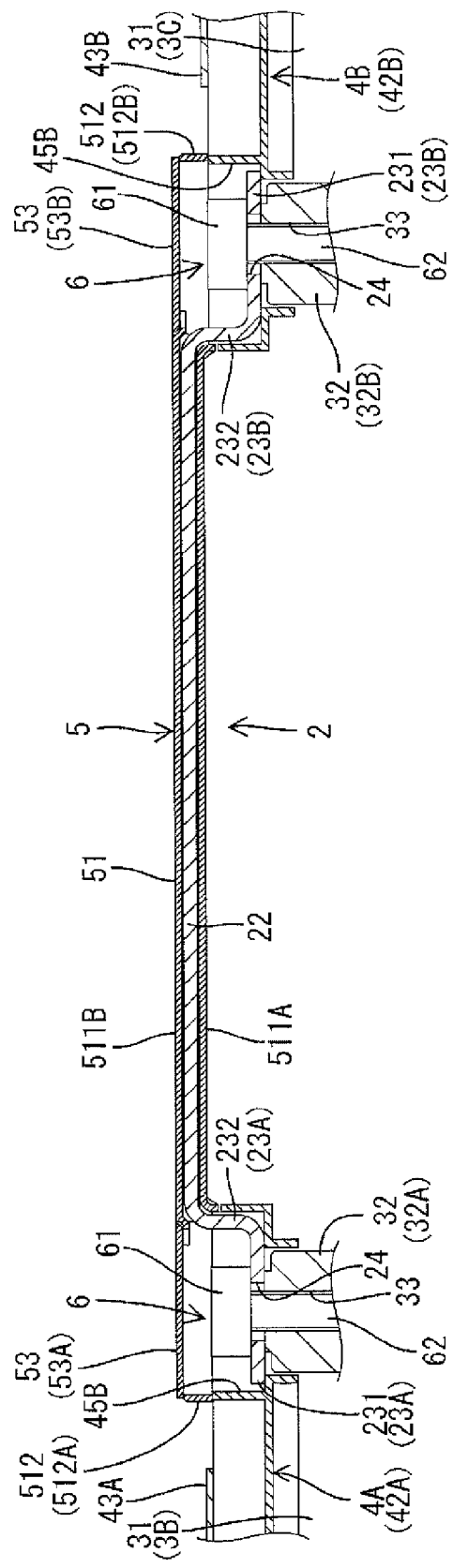
FIG. 18 is a partial cross-sectional view of the battery module including the bus bar with cover taken along the line A-A' shown in FIG. 1.

FIG. 18 is a partial cross-sectional view of the battery module 1 including the bus bar 2 with cover taken along the line A-A' shown in FIG. 1. As shown in FIG. 18, a shank portion 62 of a fixing bolt 6 is inserted into the through hole 24 and the screw hole 33 that has been positioned under the through hole 24. Furthermore, a predetermined tool is placed on a head 61 provided at the end of the shank portion 62 and is used to rotate the fixing bolt 6. Accordingly, the shank portion 62 of the fixing bolt 6 is screwed into the screw hole 33 in a state where the head 61 presses the end 23 of the bus bar 21 against the electrode terminal 32. That is to say, the ends 23 of the bus bar 21 are bolted by the fixing bolts 6 to the electrode terminals 32. In this manner, the ends of the bus bar 2 with cover (the ends 23 of the bus bar 21) are fixed (i.e., bolted) to the electrode terminals 32 using the fixing bolts 6.

Incidentally, the operation that attaches the fixing bolts 6 to the ends 23 of the bus bar 21 and to the electrode terminals 32 as described above is performed in a state where the lid portions 53A and 53B in the bus bar 2 with cover are open, for example, as shown in FIG. 17. The operation that attaches the fixing bolts 6 is performed in a state where a tool (e.g., a hex wrench) is inserted into the frame members 512. Accordingly, if the lid portions 53 are open outward from the frame members 512 as shown in FIG. 17, the tool can be prevented from being brought into contact with and interfering with the lid portions 53, for example. That is to say, even when the bus bar cover 5 is attached to the bus bar 21, the bus bar cover 5 does not interfere with the operation that attaches the fixing bolts 6 as long as the lid portions 53 are open.

After the ends 23 of the bus bar 21 and the electrode terminals 32 are fixed using the fixing bolts 6, the lid portions 53A and 53B of the bus bar cover 5 are closed as shown in FIG. 18 (or FIG. 1). Note that the lid portions 53A and 53B are fixed to the frame members 512A and 512B. The ends 23A and 23B of the bus bar 21 that have been exposed from the bus bar cover 5 up till then are respectively covered by the lid portions 53A and 53B from above. The ends 23A and 23B of the bus bar 21 extending to link the first battery module 1A and the second battery module 1B are protected by the lid portions 53A and 53B. Accordingly, tools or the like can be prevented from being brought into contact with the ends 23A and 23B of the bus bar 21.

Furthermore, the surfaces of the lid portions 53A and 53B are flush with the surface of the main body portion 51 (the top portion 511B of the tubular member 511). The entire surface of the bus bar cover 5 is flat. The bus bar 2 with cover of this embodiment has the ends 23A and 23B of the bus bar 21 each of which projects downward in the shape of an L. Furthermore, the position of the head 61 of the fixing bolt 6 is set to be lower than the bus bar main body portion 22 of the bus bar 21. That is to say, the head 61 of the fixing bolt 6 is prevented from projecting to a position higher than the bus bar main body portion 22. Accordingly, the positions of the surfaces of the lid portions 53A and 53B can match the position of the surface of the main body portion 51 (the top portion 511B of the tubular member 511). Accordingly, the lid portions 53A and 53B of this embodiment are prevented from projecting to a position higher than the main body portion 51, and, thus, the lid portions 53A and 53B are prevented from interfering with objects and the like outside the battery module 1.

Furthermore, the lid portions 53A and 53B are directly attached to the frame members 512A and 512B respectively via the hinge portions 52A and 52B. The lid portions 53A and 53B are formed in one piece with the main body portion 51. Accordingly, there is no risk that the lid portions 53 are detached from the main body portion 51 and lost.

Note that, as shown in FIG. 18, the frame member 512A of the bus bar cover 5 is placed on the container-like portion of the resin protector 42A surrounding the opening portion 45B. Furthermore, the end 23A of the bus bar 21 is inserted into the container-like portion surrounding the opening portion 45B. Furthermore, the electrode terminal 32A is disposed so as to be exposed from the bottom side of the container-like portion surrounding the opening portion 45B.

If the portion into which the end 23A of the bus bar 21 is inserted is in the shape of a container that surrounds the electrode terminal 32A in this manner, the L-shaped end 23A of the bus bar 21 is easily guided onto the electrode terminal 32A. When the end 23A of the bus bar 21 is fitted to the container-like portion, the position of the end 23A of the bus bar 21 can substantially match that of the electrode terminal 32A.

Note that the rising portion 232 at the end 23A of the bus bar 21 is in contact with the peripheral wall of the container-like portion surrounding the opening portion 45B. Furthermore, the fixing portion 231 at the end 23A, as well as the upper face of the electrode terminal 32A, is in contact with the bottom of the container-like portion surrounding the opening portion 45B.

In a similar manner, the frame member 512B of the bus bar cover 5 is placed on the container-like portion of the resin protector 42B surrounding the opening portion 45B. Furthermore, the end 23B of the bus bar 21 is inserted into the container-like portion surrounding the opening portion 45B. Furthermore, the electrode terminal 32B is disposed so as to be exposed from the bottom side of the container-like portion surrounding the opening portion 45B. If the portion into which the end 23B of the bus bar 21 is inserted is in the shape of a container that surrounds the electrode terminal 32B in this manner, the L-shaped end 23B of the bus bar 21 is easily guided onto the electrode terminal 32B. When the end 23B of the bus bar 21 is fitted to the container-like portion, the position of the end 23B of the bus bar 21 can substantially match that of the electrode terminal 32B.

Note that the rising portion 232 at the end 23B of the bus bar 21 is in contact with the peripheral wall of the container-like portion surrounding the opening portion 45B. Furthermore, the fixing portion 231 at the end 23B, as well as the upper face of the electrode terminal 32B, is in contact with the bottom of the container-like portion surrounding the opening portion 45B.

As described above, the bus bar 2 with cover of this embodiment does not interfere with the attachment operation to the battery modules 1A and 1B as long as the lid portions 53A and 53B are open during the attachment operation. Furthermore, if the lid portions 53A and 53B are closed after the attachment operation, the ends of the bus bar 2 with cover are protected by the insulating material. Accordingly, the bus bar 2 with cover of this embodiment allows the attachment operation to the battery modules 1A and 1B to be easily performed, and, furthermore, the entire bus bar 21 is covered by the bus bar cover 5 after the attachment operation, so that the bus bar 2 with cover can be reliably protected by the insulating material.

Embodiment 2

Figure 19:
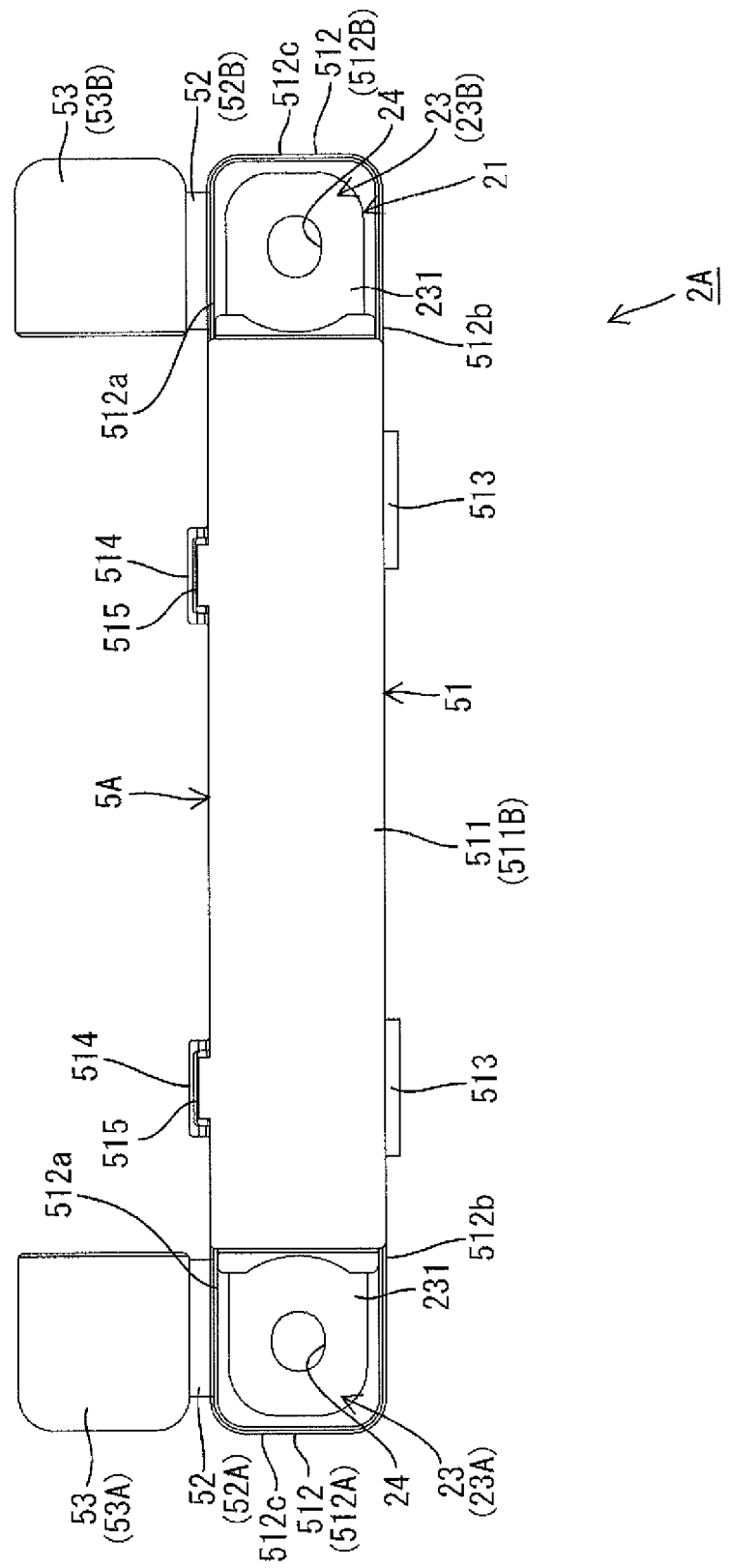
FIG. 19 is a plan view of a bus bar with cover according to Embodiment 2.

Next, Embodiment 2 will be described with reference to FIG. 19. FIG. 19 is a plan view of a bus bar 2A with cover according to Embodiment 2. The bus bar 2A with cover of Embodiment 2 is formed by attaching a bus bar cover 5A to the bus bar 21 that is the same bus bar as in Embodiment 1. The bus bar cover 5A has the same basic configuration as that of the bus bar cover 5 of Embodiment 1. Note that the bus bar cover 5A of this embodiment does not include the engagement portions 531 and the engageable portions 54, which are included in the bus bar cover 5 of Embodiment 1.

According to the bus bar cover 5A of this embodiment, the lid portions 53A and 53B are respectively attached to the frame members 512A and 512B using an adhesive tape or the like. In this manner, the lid portions 53A and 53B may be respectively attached to the frame members 512A and 512B using an adhesive tape or the like.

Other Embodiments

The present invention is not limited to the embodiments described above with reference to the drawings, and the technical scope thereof also encompasses, for example, embodiments as below.

(1) In the foregoing embodiments, the ends 23 of the bus bar 21 are each bent in the shape of an L, but, in other embodiments, the ends 23 may extend in a straight line together with the bus bar main body portion 22.

(2) In the foregoing embodiments, the bus bar main body portion 22 of the bus bar 21 extends in a straight line, but, in other embodiments, it may be bent, for example, in the shape of a crank.

(3) In the foregoing embodiments, the lid portions 53 of the bus bar cover 5 are attached via the hinge portions 52 to the portions 512a of the frame members 512, but, in other embodiments, they may be attached to different positions in the frame members 512 as necessary.

(4) In the foregoing embodiments, the lid portions 53 of the bus bar cover 5 are provided with the frame-shaped engagement portions 531, and the frame members 512 are provided with the protrusion-like engageable portions 54. However, in other embodiments, conversely, the lid portions 53 may be provided with the protrusion-like engageable portions 54, and the frame members 512 may be provided with the frame-shaped engagement portions 531.

(5) In the foregoing embodiments, the cell groups 3A and 3B connected by the first battery wiring module 4A and the cell groups 3C and 3D connected by the second battery wiring module 4B are electrically connected to each other by the bus bar 21 (the bus bar 2 with cover). However, in other embodiments, the cell groups without the battery wiring modules 4A and 4B may be electrically connected to each other by the bus bar 21 (the bus bar 2 with cover).

The invention claimed is:

1. An insulating bus bar cover that is attachable to a bus bar between (i) a first cell group in which a plurality of cells, each including a positive and negative electrode terminal, are arranged in a row, and (ii) a second cell group of a same type adjacent to the first cell group, both ends of the bus bar being respectively fixable to electrode terminals having opposite polarities in order to electrically connect the electrode terminals, the bus bar cover comprising:
    a main body portion configured to cover the bus bar while exposing both ends of the bus bar, the main body portion being disposed spaced from the respective ends of the bus bar in a first direction perpendicular to a longitudinal direction of the main body portion, the main body portion including:
        a tubular member configured to cover the bus bar while exposing both ends of the bus bar; and
        frame members provided at ends of the tubular member, the frame members extending from the respective ends of the tubular member in order to surround the ends of the bus bar exposed from the tubular member when viewed in a plan view while the frame members are spaced from the ends of the bus bar in the first direction directly above the ends of the bus bar;
    hinge portions provided on the frame members; and
    lid portions that are attached via the hinge portions to the frame members, and are pivotable by the hinge portions so as to cover or expose the ends of the bus bar.

2. The bus bar cover according to claim 1, further comprising:
    engagement portions that are provided on the lid portions; and
    engageable portions that are provided on the frame members, wherein
    engagement of the engageable portions with the engagement portions fixes the lid portions in a state where the lid portions cover the ends of the bus bar.

3. The bus bar cover according to claim 1, wherein
    the tubular member includes: (i) a bottom portion that covers a lower face of the bus bar, and (ii) a top portion that covers an upper face of the bus bar, and
    the bottom portion and the top portion are detachably attached to the bus bar.

4. The bus bar cover according to claim 1, wherein
    the ends of the bus bar each respectively include: (i) a fixing portion that can be placed on the electrode terminals and fixed to the electrode terminals, and (ii) a rising portion that rises from the fixing portion.

5. The bus bar cover according to claim 2, wherein
    the ends of the bus bar each respectively include: (i) a fixing portion that can be placed on the electrode terminals and fixed to the electrode terminals, and (ii) a rising portion that rises from the fixing portion.

6. The bus bar cover according to claim 3, wherein
    the ends of the bus bar each respectively include: (i) a fixing portion that can be placed on the electrode terminals and fixed to the electrode terminals, and (ii) a rising portion that rises from the fixing portion.

7. A bus bar with a cover, comprising:
    a bus bar that is fixable between (i) a first cell group in which a plurality of cells, each including a positive and negative electrode terminal, are arranged in a row, and (ii) a second cell group of a same type adjacent to the first cell group, both ends of the bus bar being respectively fixable to electrode terminals having opposite polarities in order to electrically connect the electrode terminals; and
    an insulating bus bar cover that is attachable to the bus bar, and includes:
        a main body portion configured to cover the bus bar while exposing both ends of the bus bar, the main body portion being disposed spaced from the respective ends of the bus bar in a first direction perpendicular to a longitudinal direction of the main body portion, the main body portion including:
            a tubular member configured to cover the bus bar while exposing both ends of the bus bar; and
            frame members provided at ends of the tubular member, the frame members extending from the respective ends of the tubular member in order to surround the ends of the bus bar exposed from the tubular member when viewed in a plan view while the frame members are spaced from the ends of the bus bar in the first direction directly above the ends of the bus bar;
        hinge portions provided on the frame members; and
        lid portions that are attached via the hinge portions to the frame members, and are pivotable by the hinge portions so as to cover or expose the ends of the bus bar.

8. The bus bar with a cover according to claim 7, wherein
    the ends of the bus bar each respectively include: (i) a fixing portion that can be placed on the electrode terminals and fixed to the electrode terminals, and (ii) a rising portion that rises from the fixing portion.

* * * * *